United States Patent [19]
Liu

[11] Patent Number: 5,862,267
[45] Date of Patent: Jan. 19, 1999

[54] METHOD AND APPARATUS FOR LOCATING DATA REGIONS IN STORED IMAGES OF SYMBOLS

[75] Inventor: Lingnan Liu, Mill Creek, Wash.

[73] Assignee: Intermec IP Corp., Everett, Wash.

[21] Appl. No.: 571,257

[22] Filed: Dec. 11, 1995

[51] Int. Cl.$^6$ .................................................. G06K 9/20
[52] U.S. Cl. ........................ 382/291; 382/183; 235/462
[58] Field of Search .................................. 382/321, 312, 382/183; 235/462, 454, 472

[56] References Cited

U.S. PATENT DOCUMENTS

| | | | |
|---|---|---|---|
| 4,988,852 | 1/1991 | Krishnan | 235/462 |
| 5,155,343 | 10/1992 | Chandler et al. | 235/462 |
| 5,304,787 | 4/1994 | Wang | 235/462 |
| 5,319,181 | 6/1994 | Shellhammer et al. | 235/462 |
| 5,324,923 | 6/1994 | Cymbalski et al. | 235/454 |
| 5,378,881 | 1/1995 | Adachi | 235/462 |
| 5,378,883 | 1/1995 | Batterman et al. | 235/472 |
| 5,454,054 | 9/1995 | Iizuka | 382/321 |

FOREIGN PATENT DOCUMENTS

| | | | |
|---|---|---|---|
| 0 449 634 A2 | 10/1991 | European Pat. Off. | G06K 7/10 |
| 0 450 878 A1 | 10/1991 | European Pat. Off. | G06K 7/10 |

OTHER PUBLICATIONS

Pavlidis, Theo et al., "Information Encoding with Two–Dimensional Bar Codes," Symbol Technologies, Bohemia, NY, Jun. 1992, pp. 18–28.

Palmer, Roger C., "The Bar Code Book, Reading, Printing, and Specification of Bar Code Symbols," Helmers Publishing, Inc., Peterborough, New Hampshire, 1989, pp. 19–20, 61–62, 90–95, 137–148.

"Uniform Symbology Specification Code One," AIM USA, Pittsburgh, Pennsylvania, Jul. 1994, pp. 1–32.

*Primary Examiner*—Yon J. Couso
*Attorney, Agent, or Firm*—Seed and Berry LLP

[57] ABSTRACT

A method and apparatus locates a periphery or "bounding box" of an image of a symbol located within an image stored by a reader. The symbol preferably has a recognition pattern with an longitudinally extending bar and at least one vertically extending reference bar, such as in the Code One symbology. The method locates the positions of landmark points within the stored image. Landmark points include points at the end of the longitudinally extending bar, points at the corner or root formed between the longitudinally extending bar and the vertically extending bar, and points at the ends of the vertically extending bars. Based on the locations of the landmark points, lines are projected between pairs of the landmark points to determine an amount, if any, of optical distortion to which the image of the symbol suffers. Based on the landmark points, lines projected therebetween and the angles of any distortion, one or more bounding boxes are constructed to determine the periphery of the symbol within the stored image.

24 Claims, 20 Drawing Sheets

METHOD AND APPARATUS FOR LOCATING DATA REGIONS IN STORED IMAGES OF SYMBOLS

TECHNICAL FIELD

The present invention relates to determining the location of data regions of a symbol in a stored image, and more particularly, to methods and apparatus for identifying the areas of a two-dimensional matrix symbol where data are encoded in a stored image for processing and decoding by a symbology reader.

BACKGROUND OF THE INVENTION

Machine readable symbologies are widely used for data collection. The first bar code symbologies developed, such as UPC, EAN, Code 39 and Code 93 can be referred to as "linear" symbologies because the data in a given symbol was decoded along one direction or axis. The next generation of bar code symbologies, called stacked reader symbologies, such as Code 49 and PDF 417, increase the information density of the symbol by employing several adjacent rows, each row having several symbol characters defined by groups of multiple width bars and spaces.

A recently developed symbology, Code One, is a two-dimensional matrix symbology. As shown by a symbol 800 of FIG. 1, Code One symbols include a recognition pattern 802, a matrix of square data cells 804, rather than one or more rows of bars and spaces, vertical reference patterns 806, which extend away from the recognition pattern 802. The areas of square data cells 804 above the recognition pattern 802, and below the recognition pattern 802, respectively, are defined by an upper bounding box 808 and a lower bounding box 809. The recognition pattern 802 runs horizontally through the Code One symbol 800, while the vertical reference patterns 806 extend perpendicularly from the recognition pattern 802. These vertical recognition patterns 806 are used to help find the symbology, and determine the symbology's tilt and orientation to take into account any surface curvature of the symbol 800.

Each of the data cells 804 in the matrix encodes one bit of data: a white data cell represents a 0 and a black data cell represents a 1. Each symbol character in the Code One symbology is generally constructed from eight data cells in a rectangular array of two rows that each have four data cells. Each set of eight data cells in a Code One symbol character encodes an 8-bit byte of binary data. The ASCII values in the Code One symbology are equal to the standard ASCII values in the computer industry plus one.

In a given Code One symbol, the symbol characters are ordered in a row-wise fashion from left to right, and the "rows" of symbol characters are arranged from top to bottom in the symbol. Each row of symbol characters in a Code One symbol consists of a pair of adjacent rows of data cells. The first symbol character in the Code One symbol is in the top left corner of the symbol and the last symbol character is in the bottom right corner. A reader analyzes the symbol characters in a Code One symbol from the first symbol character in the symbol's top left corner rightward to the right edge of the top row, and then from the left edge rightward along the second row, and so forth. Assuming the reader encounters no difficulties, each symbol character analyzed in a Code One or other symbology is converted into corresponding data to be used by the reader, the user, or other peripheral equipment.

The recognition pattern 802 is comprised of a plurality of elements including bars 810 and spaces 812. The recognition pattern 802 is used to identify the version (i.e., the type) of Code One symbol being used. Further, the recognition pattern 802 is used to determine the X-dimension of the Code One symbol 800. For example, the X-dimension represents the smallest height (or width) of the data cells 804 in the Code One symbology. The X-dimension is used to determine the intended dimension that an area symbology is based on, regardless of printing errors, and is necessary for decoding the symbology.

The reader used to scan the Code One symbol 800 is a two-dimensional imaging device which detects all the spaces 810 and the bars 812 of the recognition pattern 802, as well as the vertical reference patterns 806 using a fast linear image search routine used in high-speed scanning applications. A memory stores the scanned image and includes an array of memory locations that correspond to and represent a pixel field of view of the reader (e.g., a rectangular array of 582 by 752 pixels). The stored image is referenced by a Cartesian coordinate system relative to the imaging device or memory so that the location of each pixel is represented by a pair of numbers indicating the horizontal and vertical position of the pixel in the stored image. For example, the first pixel in the top left corner of the stored image is assigned the Cartesian coordinates (0,0) while the bottom right-most pixel is assigned the coordinates (752, 582). Therefore, data cells 804 associated with groups of pixels can be arithmetically located using known geometric and trigonometric properties based on the coordinate system.

In the prior art, as shown in FIG. 2, to determine the location of all the data cells 804 within the stored image, the image search routine was used to locate a long bar 814 of the recognition pattern 802, then the X-dimension was determined from the recognition pattern 802. Next, an angle 816 that the long bar 814 makes with the X axis of the Cartesian coordinate system of the overall image was determined. Finally, using the above X-dimension and angle 816, a bounding box 807 of the symbol 800 defined by the boundary lines of the symbol 800 was determined.

The prior method computes one bounding box 807 for the Code One symbol 800 enclosing the entire symbol 800. The boundary box 807 is the sum of upper bounding box 808, lower bounding box 809 and the center pattern recognition 802. To determine the size and location of the bounding box 807, an end point 818 of the long bar 814, i.e., $ep_1$, was located and a path 820, substantially along the Y-axis of the Cartesian coordinate system, i.e., directed away from the recognition pattern 802, was traversed for a predetermined number of the X-dimensions. The direction of the path 820 was determined by the angle that is vertical to the long bar 814 (i.e., the angle 816) to establish an end corner point $cp_1$ 824 of the bounding box 807. The other corner point 828, i.e., $cp_2$, of the bounding box 807, and the other corner points 842 and 844, i.e., $cp_3$ and $cp_4$, of the bounding box 807 were determined in a similar manner. With these corner points, the complete bounding box 807 was defined, and all square data cells 804 were assumed to lie within this region for purposes of information retrieval from the image when the size of the X-dimension and the version of the symbol were known.

Although the prior art method of determining the bounding box 807 of the Code One symbol is effective when the symbol 800 is in its proper position, and has no significant surface curvature, it becomes highly prone to errors when the symbology 800 is optically distorted, e.g., when an image of the symbol is stored when a reader is significantly tilted with respect to the symbol. In other words, when the upper and lower bounding boxes 808 and 809 do not have the same size and shape, and the X-dimension varies within the symbol, data can be lost during the decoding process.

For example, as shown by an optically distorted symbol 800' in FIG. 3, even a slight deviation between the angle the long bar 814 makes with an X axis of the Cartesian coordinate system causes the computed bounding box 807 defined by the dashed boundaries with four corners cp1, cp2, cp3, and cp4 to differ from the true bounding box for the symbol (shown as the solid line quadrilateral 830). Additionally, optical distortions causing the stored image of the symbol to appear trapezoidal or otherwise optically distorted, as shown in FIG. 3, causes the perimeter of the stored image of the symbol 830 to differ significantly from the bounding box 807 computed by the prior art method. As a result, information retrieval errors will result by sampling within the computed bounding box 807. Important data within the true bounding box 830 can be ignored, such as the information located in shaded areas 837 of FIG. 3. This is because when following an angle that has a slight error, the resulting positional error can be huge if the distance along the path is large enough. In other words, the error will accumulate to a significant degree using the prior art method, even if only a small amount of error is present in the direction of the path. Similarly, when there is a slight error in X-dimension, the total error will be larger if the distance is large enough. Thus, what is needed is a method of determining the bounding box that localized the data region and is free from error, and which will ensure that all the square data cells 804 fall within the true bounding box.

SUMMARY OF THE INVENTION

A method and apparatus locates a periphery or "bounding box" of two data areas in an image of a symbol located within an image stored by a reader. The symbol preferably has a recognition pattern with a longitudinally extending bar and at least one vertically extending reference bar, such as in the Code One symbology. The method locates the positions of landmark points within the stored image. Landmark points include points at the end of the longitudinally extending bar, points at the corner or root formed between the longitudinally extending bar and the vertically extending bar, and points at the ends of the vertically extending bars. Based on the locations of the landmark points, lines are projected between pairs of the landmark points to determine an amount, if any, of optical distortion to which the image of the symbol suffers. Based on the landmark points, lines projected therebetween and the angles of any distortion, two bounding boxes, one above the center recognition pattern and one below it, are constructed to determine the periphery of the symbol within the stored image.

In a broad sense, the present invention embodies a method for computing a location of data regions enclosed by the corresponding bounding boxes in a stored image of a symbol. The symbol includes a recognition pattern having an outermost bar and at least one vertical reference pattern extending perpendicularly from the recognition pattern. For upper bounding boxes, the method includes the steps of: (i) locating a position of a first end point and a second end point of the outermost bar of the recognition pattern; (ii) locating a position of an outermost point of each of the at least one vertical reference pattern; (iii) determining a position of a first corner point and a second corner point for the symbol by extending at least one line from the outermost point a predetermined distance in a predetermined direction; and (iv) defining a periphery of the upper data region of the symbol using the positions of the first end point, the second end point, the first corner point, and the second corner point.

For locating a lower bounding box, the method includes the steps of: (i) locating a position of a first end point and a second end point of a bottom-most bar of the recognition pattern, extending the end points by a predetermined number of X-dimensions to find the top two corner points of the lower boundary box; (ii) locating a position of an outermost point of each of the at least one vertical reference pattern; (iii) determining a position of a third corner point and a fourth corner point for the symbol by extending at least one line from the outermost point a predetermined distance in a predetermined direction; and (iv) defining a periphery of the lower data region of the symbol by the first, second, third and fourth corner points.

The present invention also embodies an apparatus for decoding a machine-readable symbol that represents encoded information. The symbol has a recognition pattern with an outermost bar and at least one vertical reference pattern extending approximately perpendicular from the recognition pattern. The apparatus includes a sensor that receives light reflected from the symbol. The sensor produces an output signal therefrom.

A receiver receives the output signal and produces a data signal indicative of the encoded information, the recognition pattern and at least one vertical reference pattern. A processor for decoding the encoded information encoded in the symbol is programmed to (a) locate a position of a first end point and a second end point of the outermost bar of the recognition pattern, (b) locate a position of an outermost point of each of the at least one vertical reference pattern, (c) determine a position of a first corner point and a second corner point for this symbol by extending at least one line from the outermost point a predetermined distance in a predetermined direction, (d) define a periphery of an upper data region of the symbol using the positions of the first end point, the second end point, the first corner point and the second corner point, and (e) decode the encoded information within the periphery of the symbol. The processor is also programmed to similarly determine the periphery of a lower data region of the symbol.

DETAILED DESCRIPTION OF THE INVENTION

Figure 1:
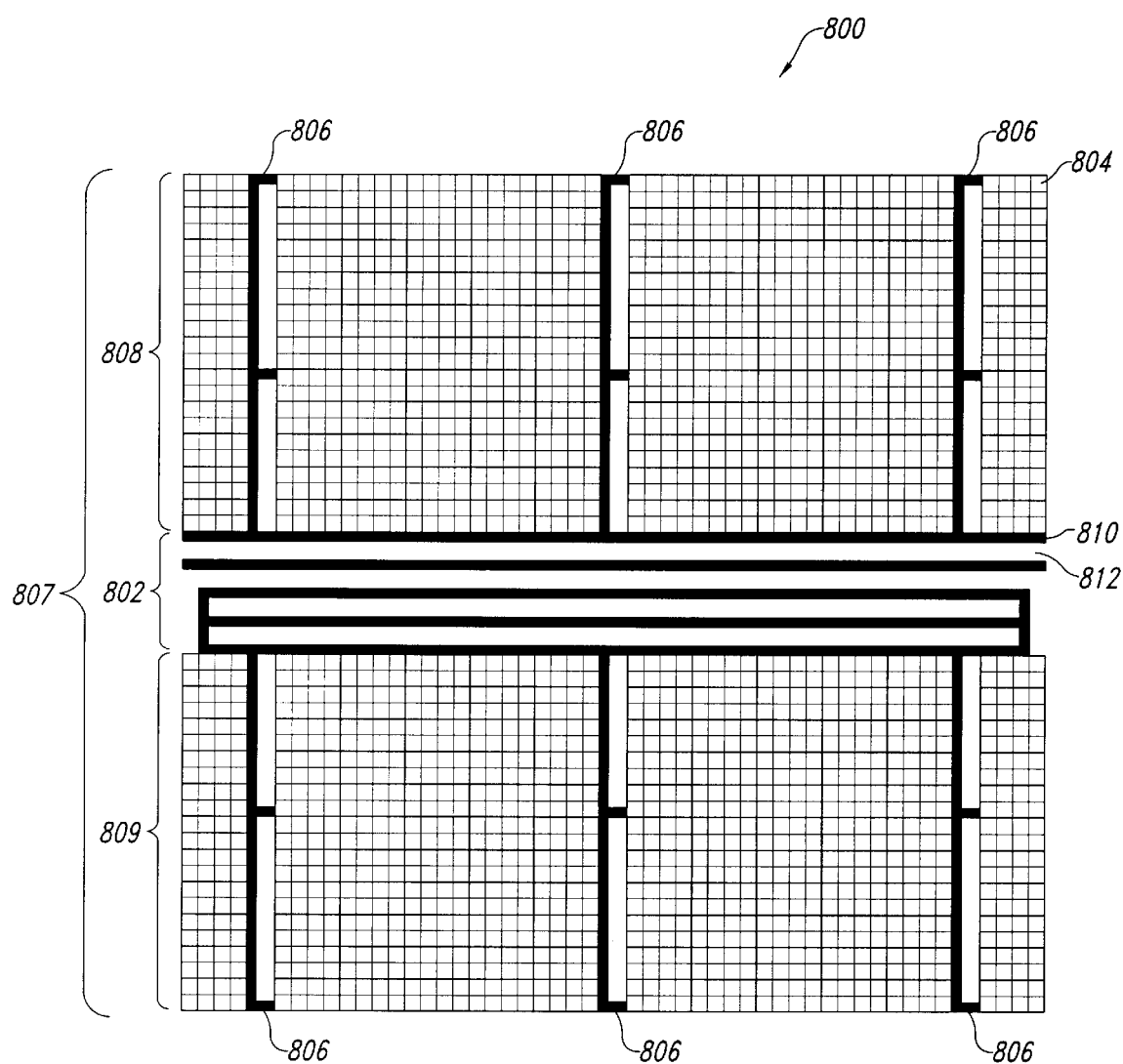
FIG. 1 shows a Version E Code One symbol.
Figure 2:
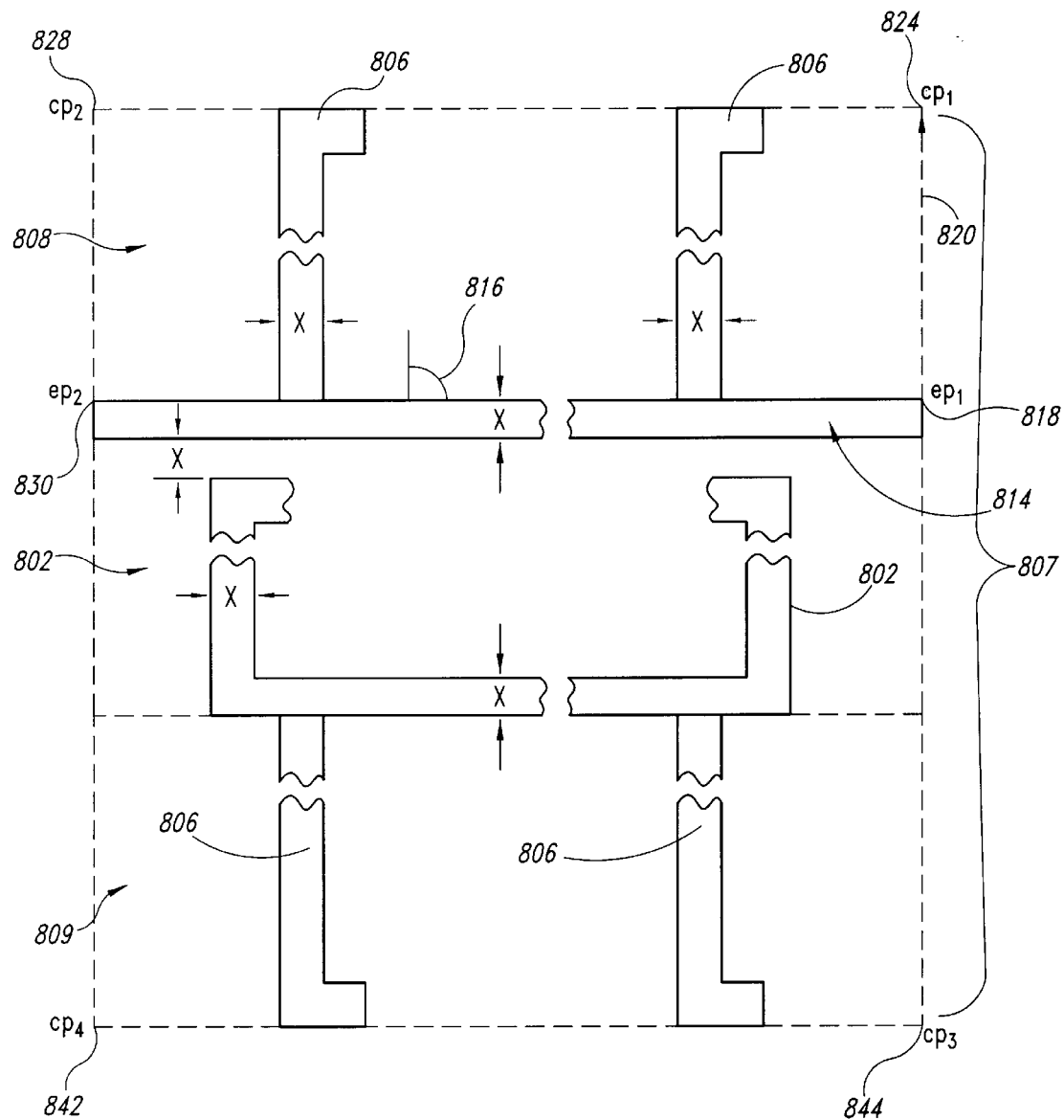
FIG. 2 is a schematic diagram of a Code One recognition pattern that shows an example of a conventional method for determining a bounding box of a Code One symbol.
Figure 3:
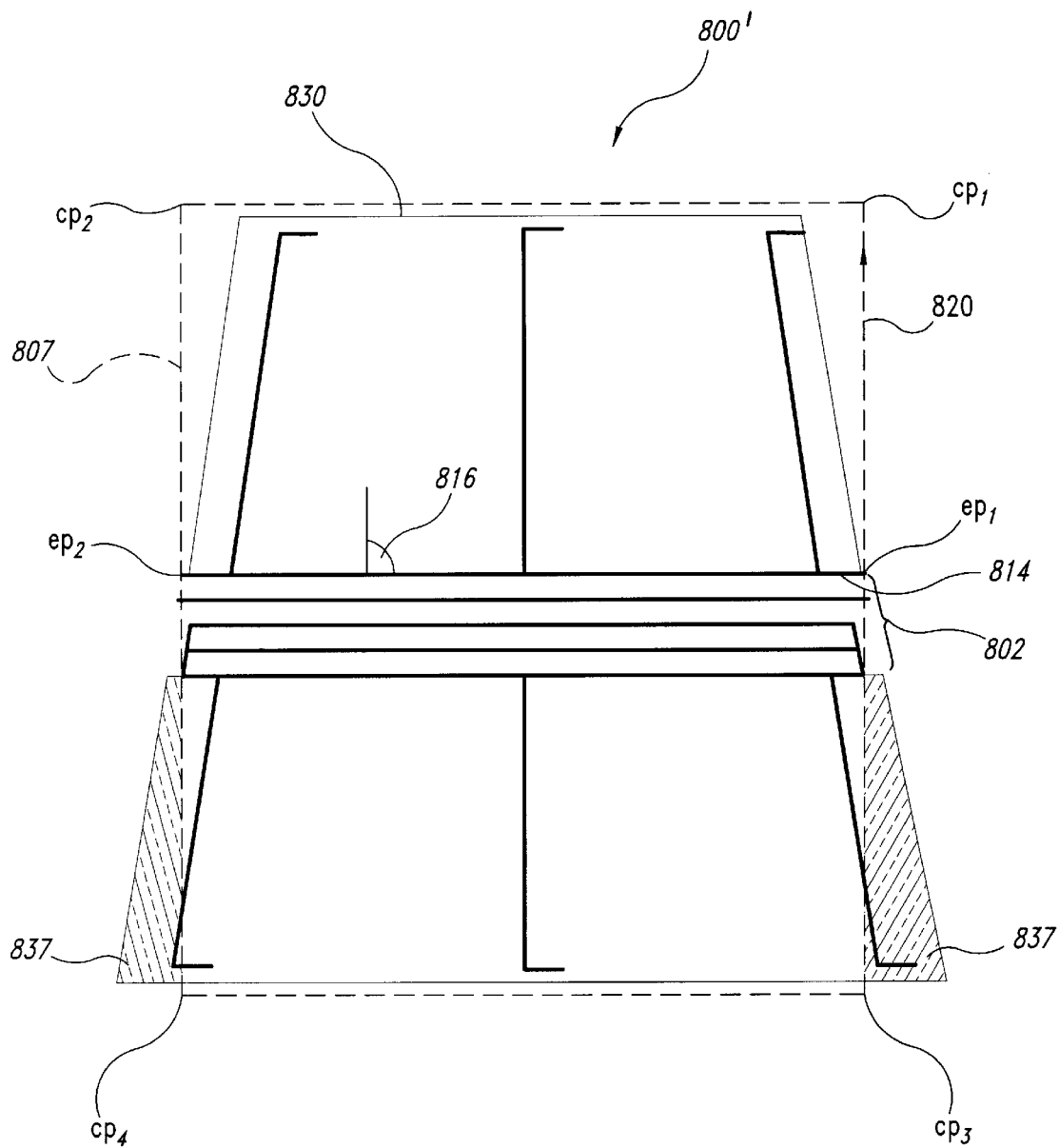
FIG. 3 is a schematic diagram of an optically distorted image of a version E Code One symbol as stored by an imaging device that is misaligned and tilted with respect to the symbol.
Figure 4:
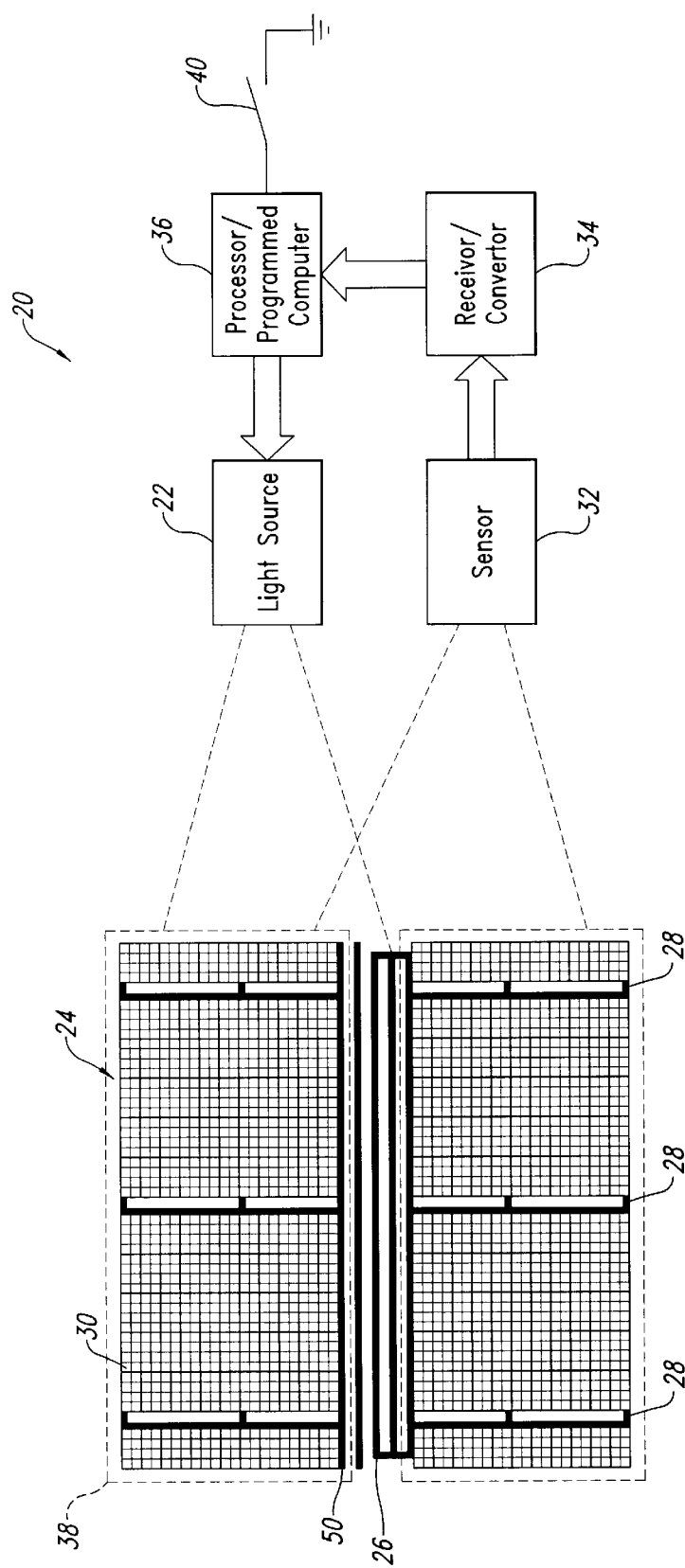
FIG. 4 shows a block diagram of a symbology reader of the present invention.

As shown in FIG. 4, a data collection symbology reader 20 of the present invention includes a light source 22 that illuminates a data collection symbol, such as Code One symbol 24 having a recognition pattern 26 and vertical reference patterns 28, as well as square data cells 30. As used herein, a data collection symbol refers to a symbol from any linear, stacked, area or other machine-readable symbology. A sensor 32 in the reader 20 receives the light reflected from the symbol 24 and converts the received light into an electrical signal. The light source 22 is preferably a flashbulb, infrared light source, one or more LEDs or other light-emitting elements, while the sensor 32 is preferably a charge-coupled device ("CCD"), two-dimensional semiconductor array, vidicon, or other area imager capable of converting received light into electrical signals.

A receiver or converter 34 receives the electrical signals from the sensor 32 and converts it into a signal to be processed by a programmed computer or processor 36. Typically, the sensor 32 produces an analog signal that represents the modulated light reflected from the elements in the symbol 24. If the processor 20 is a digital computer, then the converter 34 converts the analog signal into a digital signal to be processed by the processor 36. The converter 34 and/or processor 36 preferably include a memory for storing the digital signal. As described more fully below, the processor 36 of the reader 20 performs a routine stored in memory that provides an accurate estimate of the bounding boxes 38 of the symbol 24 regardless of whether the symbol 24 is tilted with respect to the reader 20. The routine accomplishes this by finding positions on the vertical reference bars 28 as well as bars 50 and 107 in the recognition pattern 26 and uses them to determine corner points of the bounding boxes. By traveling from the positions on the vertical reference bars 28, the path traveled to reach the corner points is reduced (i.e., the number of X-dimensions traveled is reduced) and this minimizes any deviation caused by a small error in the X-dimension or in the angle of the recognition pattern 26 with respect to a Cartesian coordinate system used for retrieval of information in the image stored by the reader 20.

The sensor 32 preferably includes a rectangular array of photosensitive elements such as CCDs. Each CCD element in the rectangular array preferably outputs a gray level signal ranging from 1–15, i.e., an analog signal that determines the amount of intensity of light impinging upon a particular pixel element. Alternatively, each pixel element in the array of the sensor 32 can output a binary signal indicating that the particular pixel element is either black or white. After the signals from the sensor 32 are approximately converted by the converter 34, the processor 36 stores the signals produced by the sensor in an image within a field of view of the sensor 32. As a result, the processor 36 may repeatedly analyze and manipulate the stored signals.

The reader 20 can be a hand-held product and can include a trigger switch 40 coupled to the processor 36. By actuating the trigger switch 40, the processor 36 causes the light source 22 to provide light to the symbol 24 that is reflected therefrom to the sensor 32. Since the processor 36 stores the signals that are output from the sensor 32 and converted by the converter 34, a user, by actuating the trigger switch 40, can cause the reader 20 to store an instantaneous image within the field of view of the reader 20, creating a snapshot of the symbol 24. The specific means and method for storing and locating an image of the symbol 24 are well known and will be understood by those in the relevant art without further need for description herein.

Figure 5A:
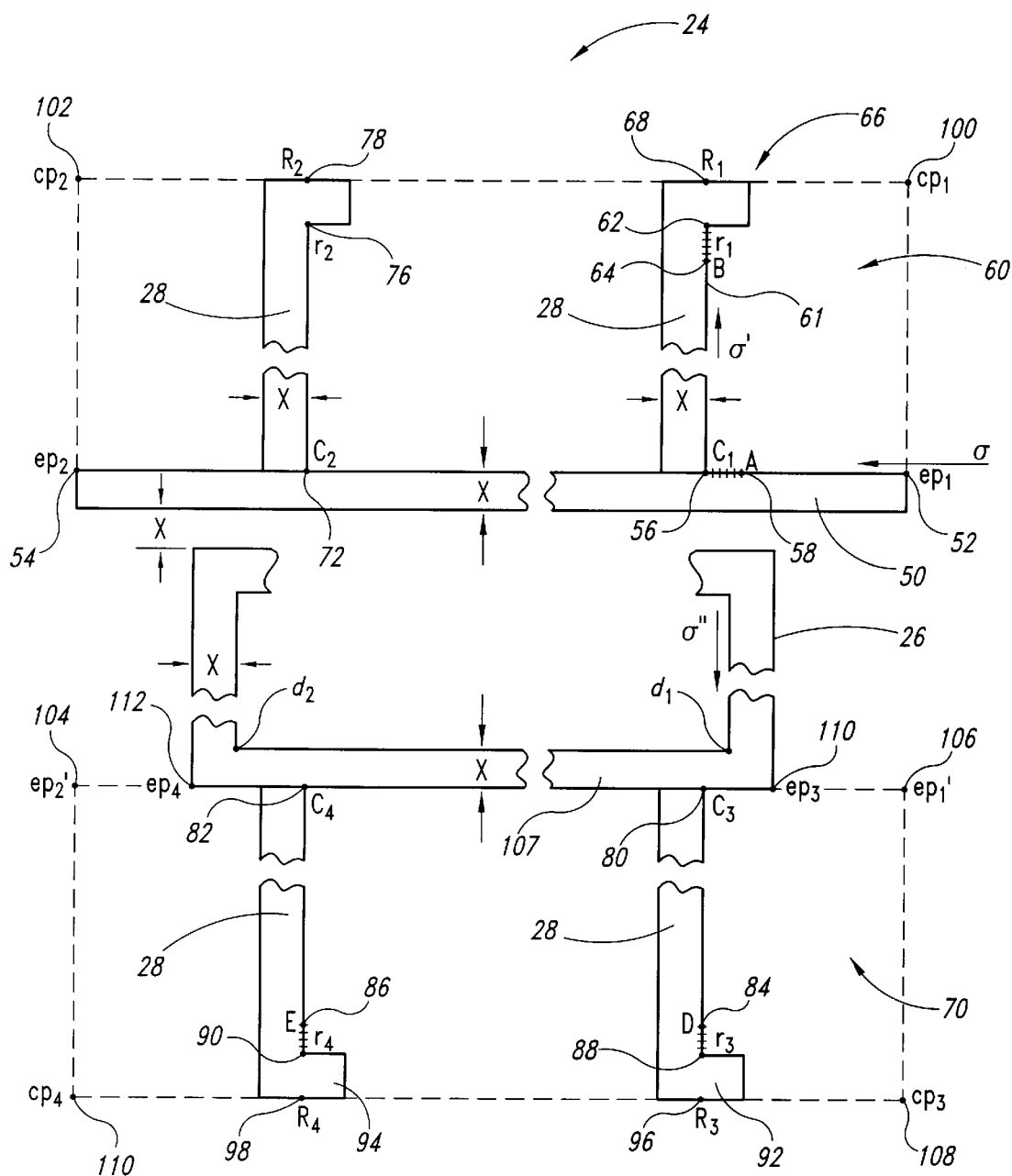
FIG. 5A is a schematic diagram of a Code One recognition pattern that shows, in a first embodiment, a method of accurately determining the bounding box of a Code One symbol.

The routine stored in the memory of processor 36 uses the instantaneous image stored in the reader 20 to determine the bounding boxes of a data collection symbology, such as a Code One symbol 24 as shown in FIG. 5A, by locating its recognition pattern 26. Then, as shown in FIG. 5A, to define a top bounding box 60, a top long bar 50 of the recognition pattern 26 is located and each of its upper end points $ep_1(52)$ and $ep_2(54)$ are determined by methods well known in the art.

Once the end points $ep_1(52)$ and $ep_2(54)$ have been determined, the root 56 (i.e., base) of the vertical reference patterns 28 that are contiguous with the top long bar 50 are found by beginning the start of a searching process, at a point A(58) which is a number Z of X-dimensions in a direction σ, the direction σ being defined as the direction along a top edge of the top long bar 50. For a version A or B Code One symbol, the preferred value of Z is 3.5, while for the remaining versions of Code One symbols, Z is preferably 5.5.

From the starting point A(58), a search, as is well known in the art, continues along the direction σ until the processor 36 encounters a sharp edge angle change. The edge angle is the gradient direction angle at the edge point. The gradient direction angle refers to the distance of greatest change in pixel intensity from a given pixel with respect to the edge direction at that pixel or point. In the present invention, the gradient direction angle at a given point is generally perpendicular to the edge of a bar or other feature in the symbol at that point. The angle change is then tested by the processor 36 to determine if the area causing the abrupt change has a width less than 50% of the X-dimension, if it does, then the search continues since the change would most likely be an aberration or distortion and not the root of the vertical reference pattern 28. Once the 50% is exceeded and the root 56 has been located, the direction of travel σ is changed to a direction σ', along an inner edge 61 of the upper right most vertical reference pattern 28. In general, as shown in the figures herein, incremental "travelling" refers generally to sampling pixel after pixel in the stored image, are shown as small hash marks, such as the marks along an outer edge of long bar 50, vertical reference bars 28, etc., in the symbol.

Thereafter, the processor 36 samples the vertical reference pattern for an inner corner (62) beginning at a point B(64). Point B(64) is M' number of X-dimensions from root 56, where the value of M' varies depending on the version of the Code One symbol. Then, starting from the point B(64), an incremental search along the new direction σ' is continued until the processor 36 encounters a sharp angle indicating that it has reached the inner corner $r_1$(62). Once the inner corner 62 is located, a path across a bar forming a foot 66 of the vertical reference pattern 28 is traversed until a top point $R_1$(68) has been determined.

Thereafter, a similar process is performed to locate root $C_2$(72) of a left most upper vertical reference bar 28, after locating end point $ep_2$(54). Inner corner point $r_2$(76) and top point $R_2$(78) are found in a manner similar to that used to determine $r_1$(62) and $R_1$(68).

To locate reference points used to determine the lower bounding box 70, the roots $C_1$(56) and $C_2$(72) of the vertical reference patterns 28 in the upper bounding box 60 are used. Initially, roots $C_3$(80) and $C_4$(82) of respective right and left vertical reference patterns 28 of the lower bounding box 70 are found by moving from the root $C_1$(56) to the root $C_3$(80) and from the root $C_2$(72) to the root $C_4$(82) via a direction σ", which is in the opposite direction of σ'. The path along the direction σ" initially traverses the recognition pattern 26 a distance of Z X-dimensions downward. The value of Z is determined based on the number of bars and spaces, each having a width of an X-dimension, within the version of the Code One symbol being decoded. Alternatively, after locating the root $C_3$(80), the root $C_4$(82) can be found by traversing in the direction σ. Alternatively, the root $C_3$(80) and $C_4$(82) can be found by traversing from end points $d_1$ and $d_2$, respectively, a predetermined number of X-dimensions in an outward direction from the symbol along the lowest bar of recognition pattern and then traversing one X-dimension vertically down across the bar 107.

Once the roots $C_3$(80) and $C_4$(82) have been determined, the processor 36 begins sampling at points D(84) and E(86), respectively, which are an N number of X-dimensions from the roots along a path continuing in the direction σ". Then an incremental search is made until a sharp angle is encountered indicating that inner corners $r_3$(88) and $r_4$(90) have been reached. Once the inner corners $r_3$(88) and $r_4$(90) have been located, the processor 36 continues the path along direction σ" across a foot 92 and a foot 94, respectively, to determine bottom points $R_3$(96) and $R_4$(98).

Figure 5B:
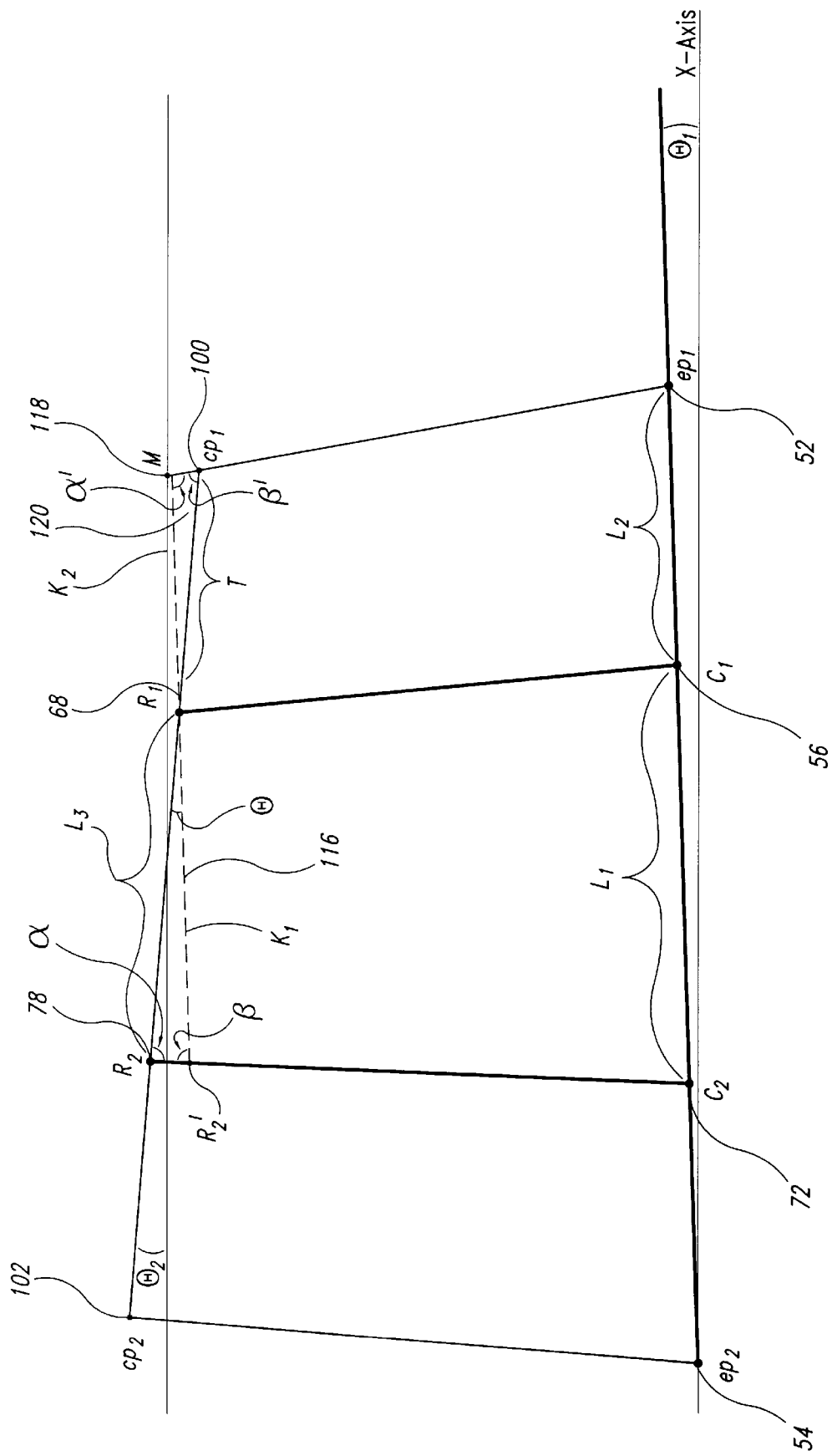
FIG. 5B is a schematic diagram that shows an example of determining a first corner point $cp_1$ for a top bounding box of the symbol of FIG. 5A.

Once all reference points have been determined, the next step is to determine the angular distortion of each bounding box. First, as shown in FIG. 5B, the processor 36 determines an angle $\Theta_1$ between the line connecting end point $ep_1$(52) and end point $ep_2$(54) with respect to the Cartesian coordinates of the image information retrieval system. Then an angle $\Theta_2$ of a line connecting top points $R_1$(68) and $R_2$(78) with respect to the Cartesian coordinate system is determined. Finally, an angle of distortion Θ is calculated using the equation: $\Theta = \Theta_2 - \Theta_1$.

The corner point $(cp_1)$100 is determined by continuing along the path of a line $\overrightarrow{R_2R_1}$ for some length T. The length T is calculated as follows:

$$T = \frac{L_3 \cdot L_2}{L_1} \cdot \frac{\sin\alpha}{\sin\beta} \cdot \frac{\sin\alpha'}{\sin\beta'}$$

where $L_1$, $L_2$, $L_3$ are lengths of lines $\overrightarrow{c_2c_1}$, $\overrightarrow{c_1ep_1}$, and $\overrightarrow{R_2R_1}$. The angles α, β, α', β' are as shown in FIG. 5B.

Figure 5C:
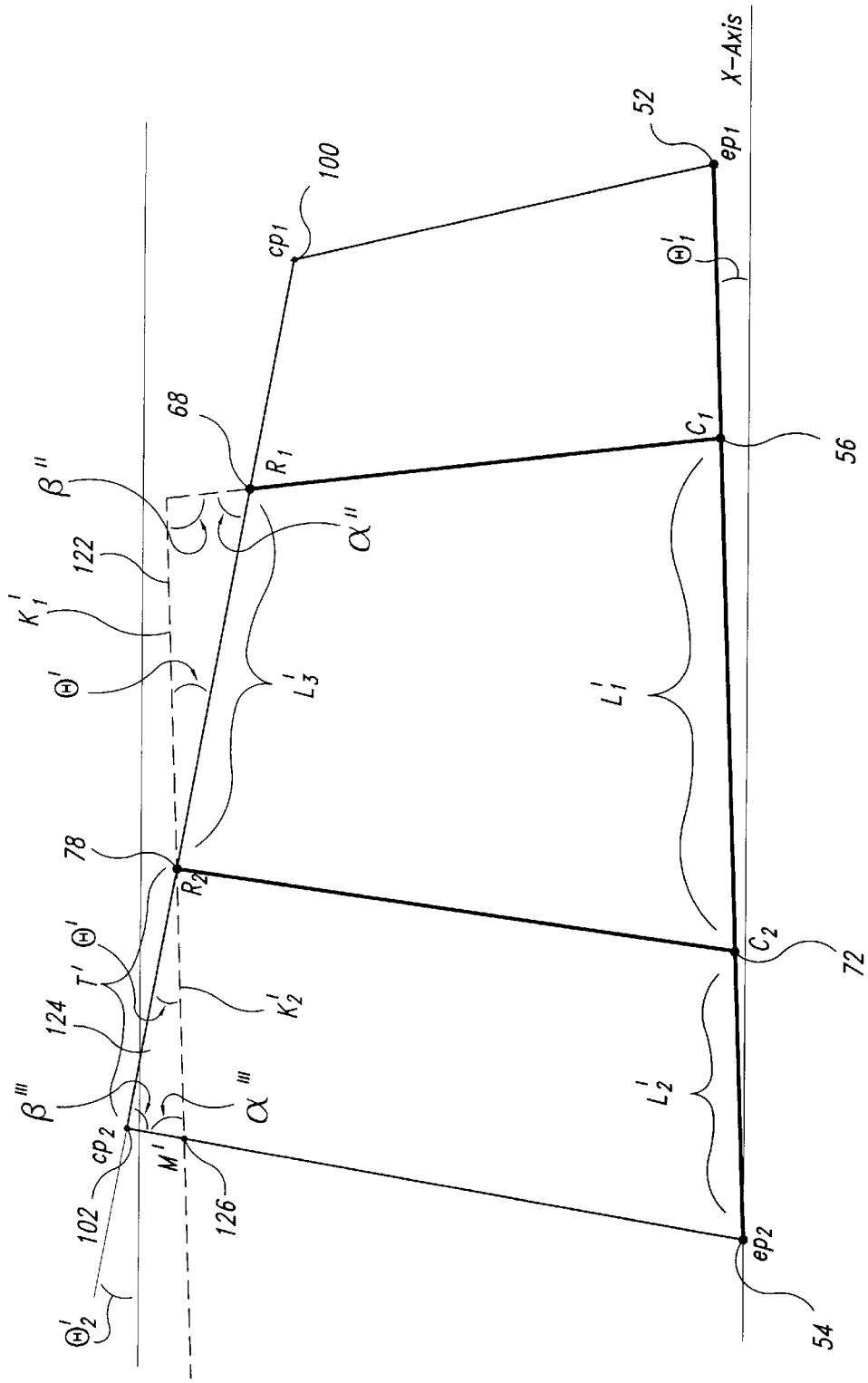
FIG. 5C is a schematic diagram that shows an example of determining a second corner point $cp_2$ of a top bounding box of the symbol of FIG. 5A.

Corner point $cp_2$(102) is calculated in a similar manner, as shown in FIG. 5C. The corner point $cp_2$(102) is determined by continuing along the path of line $\overrightarrow{R_1R_2}$ for some length T'. The length T' is calculated as follows:

$$T = \frac{L'_3 L'_2}{L'_1} \cdot \frac{\sin\alpha''}{\sin\beta''} \cdot \frac{\sin\alpha'''}{\sin\beta'''}$$

where $L'_1$, $L'_2$, $L'_3$ are the lengths of lines $\overrightarrow{c_2c_1}$, $\overrightarrow{ep_2c_2}$, and $\overrightarrow{R_2R_1}$, and angles α", β", α'''β''' are as shown in FIG. 5C.

Thus, the upper bounding box 60 is defined by the boundary that connects end point $ep_1$(52) to corner point $cp_1$(100) and corner point $cp_1$(100) to corner point $cp_2$(102) and corner point $cp_2$(102) to end point $ep_2$(54) and end point $ep_2$(54) to end point $ep_1$(52).

Figure 5D:
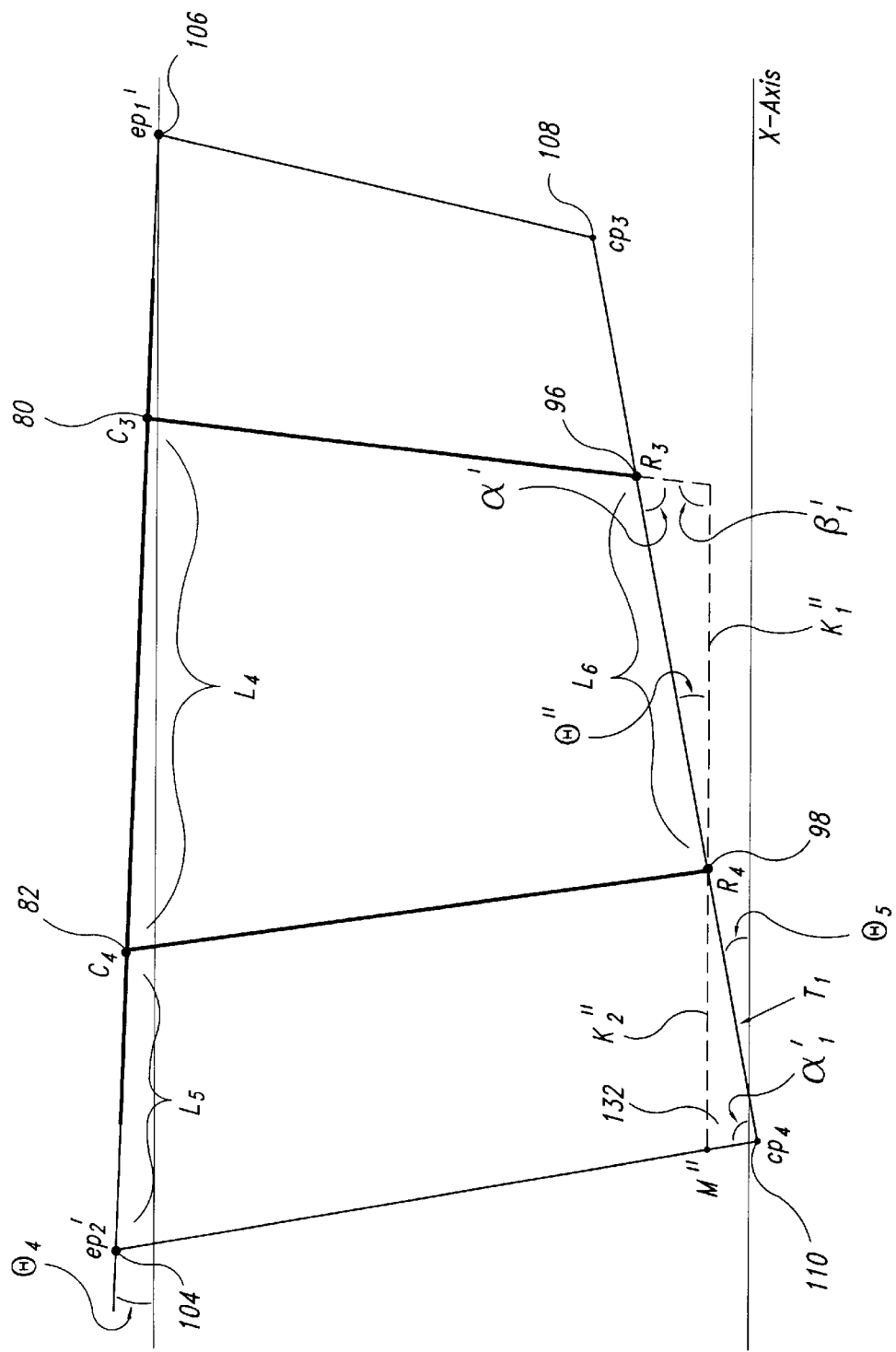
FIG. 5D is a schematic diagram that shows an example of determining a third corner point $cp_4$ for a lower bounding box of the symbol of FIG. 5A.
Figure 5E:
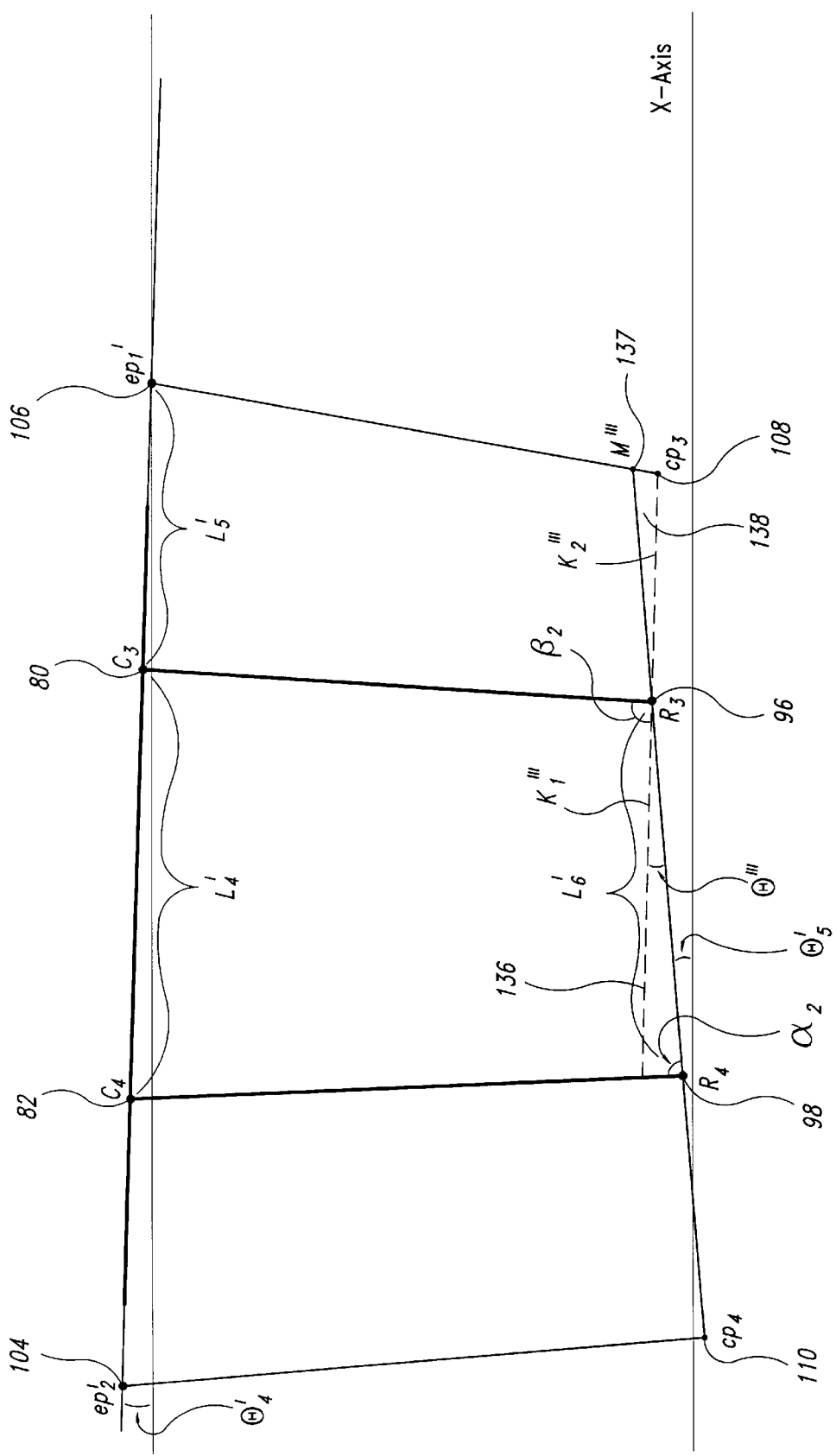
FIG. 5E is a schematic diagram that shows an example of determining a fourth corner point $cp_3$ for a lower bounding box of the symbol of FIG. 5A.

Referring to FIGS. 5D and 5E, a lower bounding box 70 can be defined by boundaries connecting end points $ep'_2$ (104) and $ep'_1$(106) with corner points $cp_3$(108) and $cp_4$ (110). Initially, a lowest short bar 107 of the recognition pattern 26 and both of its end points $ep_3$(110) and $ep_4$(112) are located by methods well known in the art. Point $ep'_2$ (104) is determined by continuing along a line $\overrightarrow{ep_3ep_4}$ some predetermined amount of X-dimension that are characteristic of the number of data cells typically extending beyond that portion of the short bar 108 for the chosen version of the symbology. Corner points $cp_3$(108) and $cp_4$(110) are found in a manner identical to corner point $cp_1$ and corner point $cp_2$ by continuing along lines $\overrightarrow{R_4R_3}$ and $\overrightarrow{R_3R_4}$, all respectively.

In this manner all the data cells within the symbology can be retrieved and the projected path distances used to determine the corner points are minimized thus minimizing deviations due to small errors in either the calculation of the X-dimension or the angle of the symbology.

A method similar to that described above can be used to define bounding boxes of version A and B of symbologies that have only one vertical reference bar in each of a lower and upper bounding box, as will be described in more detail below with respect to a second embodiment of the present invention.

In a first embodiment, the processor 36 is controlled by software that is stored as a series of program instructions in the memory of the processor 36 to perform the above-described process for acquiring the bounding boxes of the symbol 24. Flowcharts from which a source code can be written by one skilled in the art are illustrated in FIGS. 6A–6G.

Figure 6A:
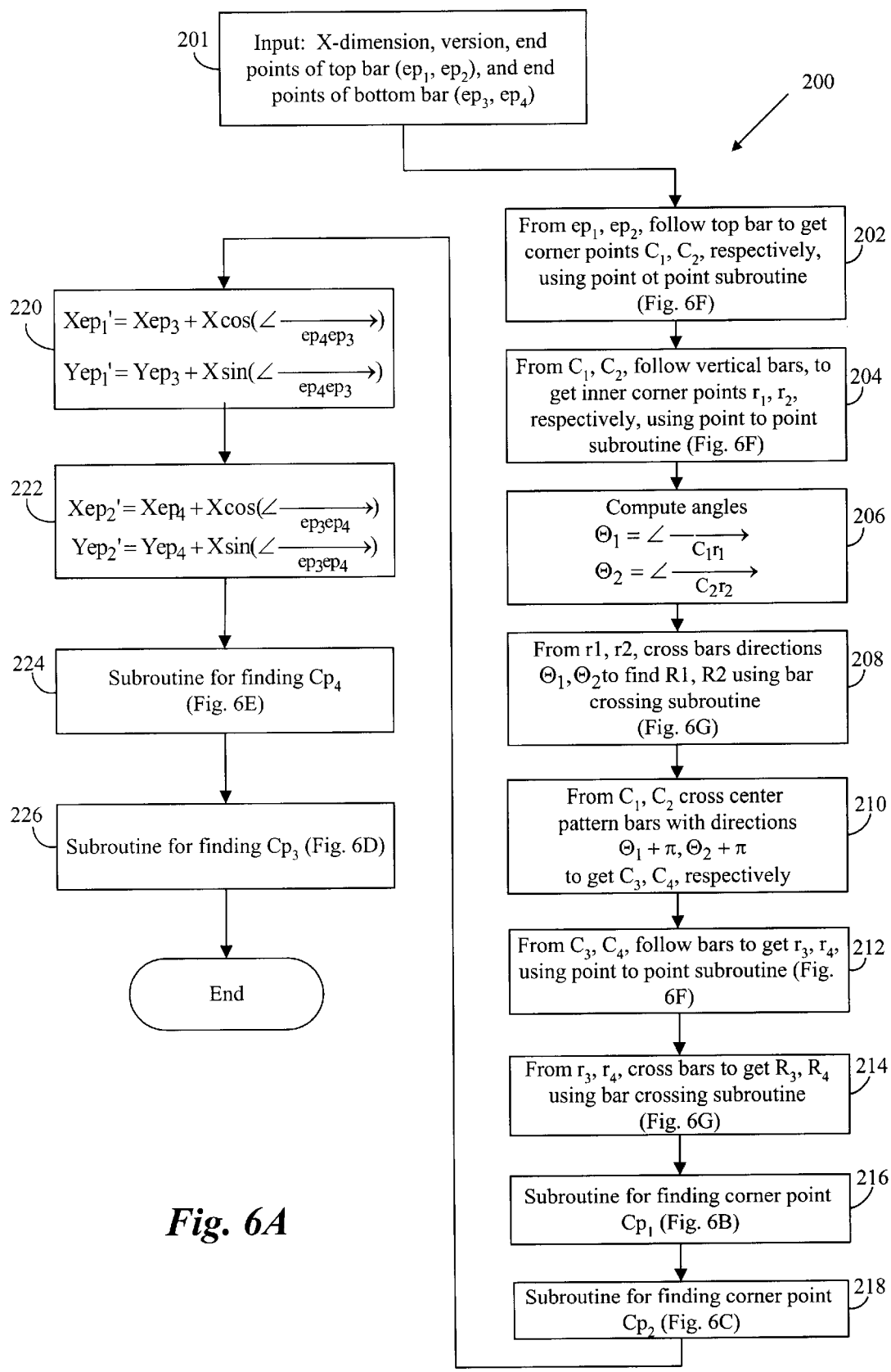
FIG. 6A is a flowchart which shows a main program implementing the first embodiment of a method used to determine the bounding box of a symbology.

Referring to FIG. 6A, a main routine 200, which is executed by processor 36, begins in step 201 by inputting to the processor 36 an X-dimension of the symbol 24. The X-dimension is preferably computed under the inventor's application Ser. No. 08/524,368, filed Sep. 6, 1995, entitled Orientation Independent Method For Robust Computation Of X-dimensions, incorporated herein by reference. Additionally, in step 201, the version of the symbol 24, end points $ep_1$(52), $ep_2$(54), $ep_3$(110), and $ep_4$(112), are independently input by an operator or automatically determined by analyzing the recognition pattern 26 by methods well known in the art.

In step 202, the processor 36 follows a top of the long bar 50 until it determines the locations of the roots $C_1$(56) and $C_2$(72). The processor 36 determines the locations by invoking a corner finding subroutine 450, as shown in FIG. 6F.

Figure 6B:
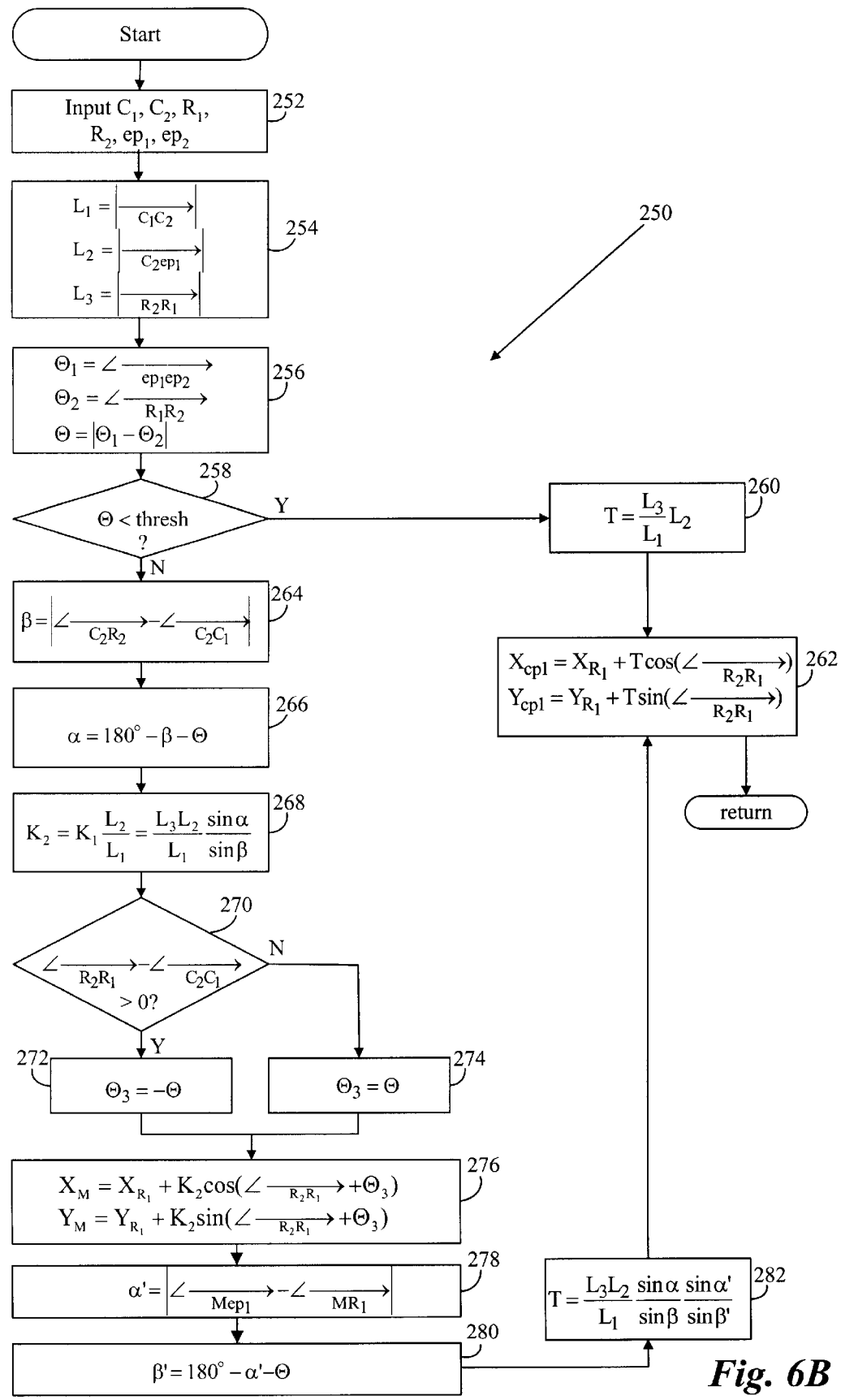
FIG. 6B is a flowchart of a subroutine in the first embodiment, invoked to determine a first corner point $cp_1$ of a top bounding box of the symbology.
Figure 6C:
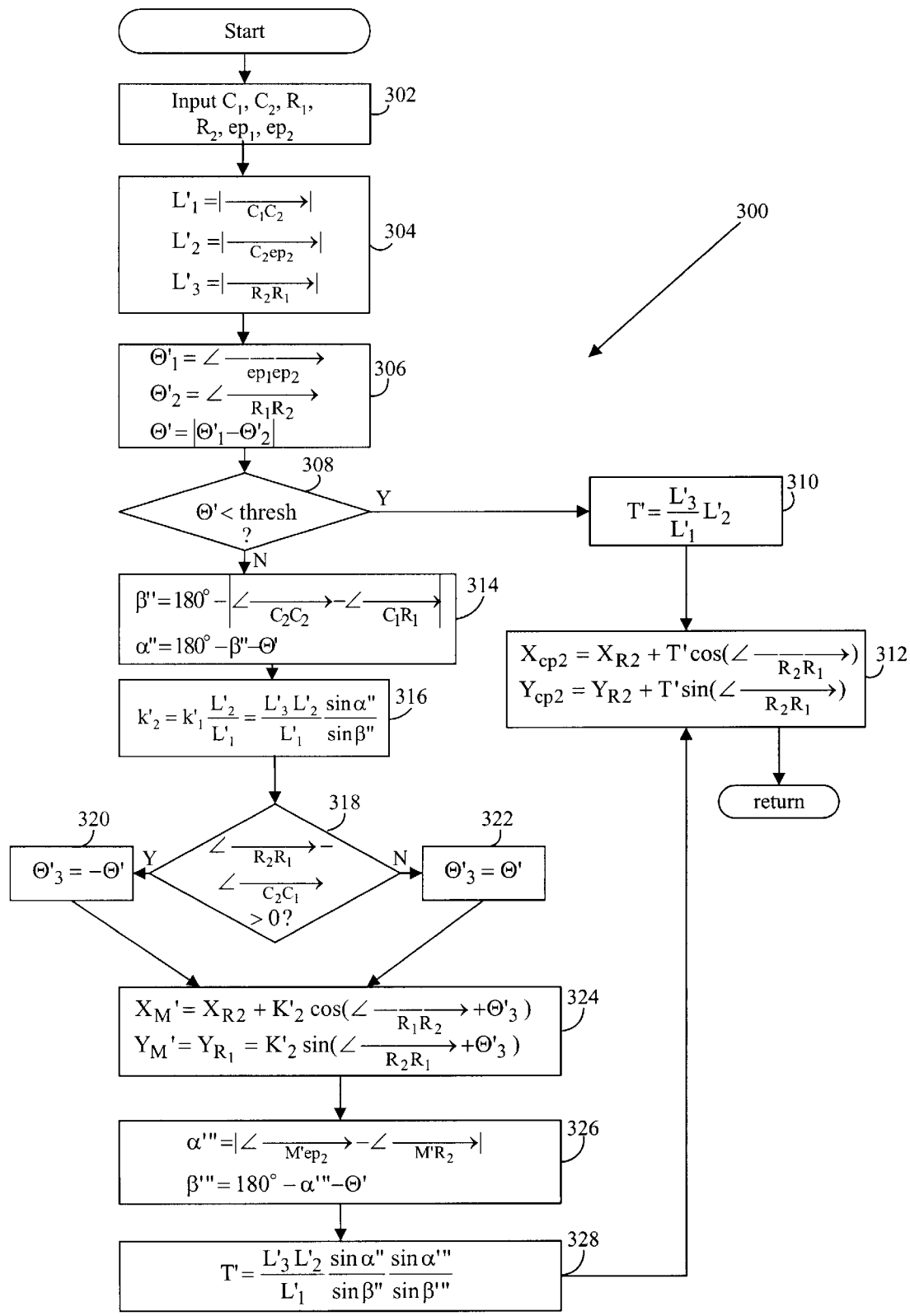
FIG. 6C is a flowchart of a subroutine in the first embodiment invoked to determine a second corner point $cp_2$ of the top bounding box of the symbology.
Figure 6D:
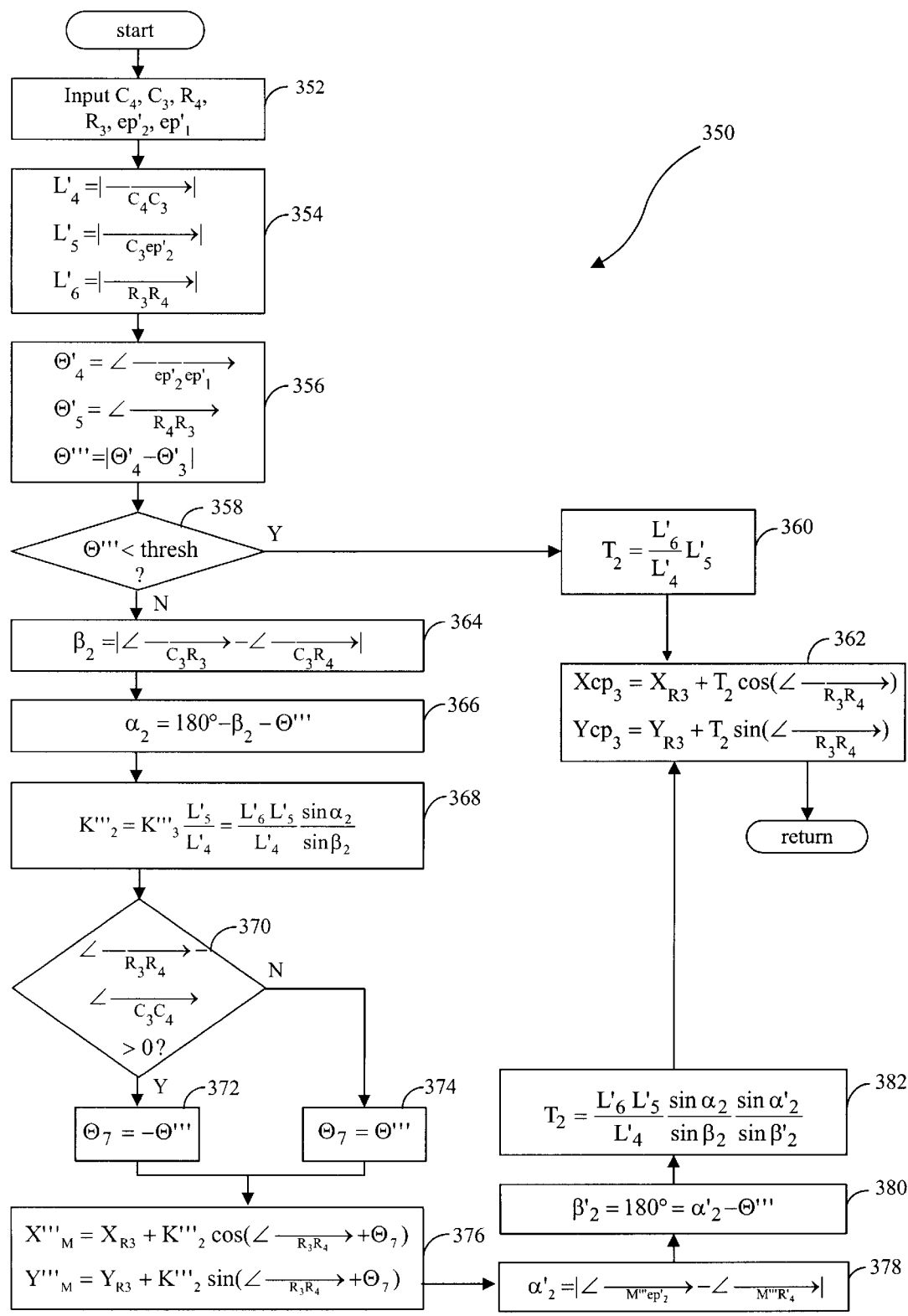
FIG. 6D is a flowchart of a subroutine in the first embodiment invoked to determine a first corner point $cp_3$ of a bottom bounding box of the symbology.
Figure 6E:
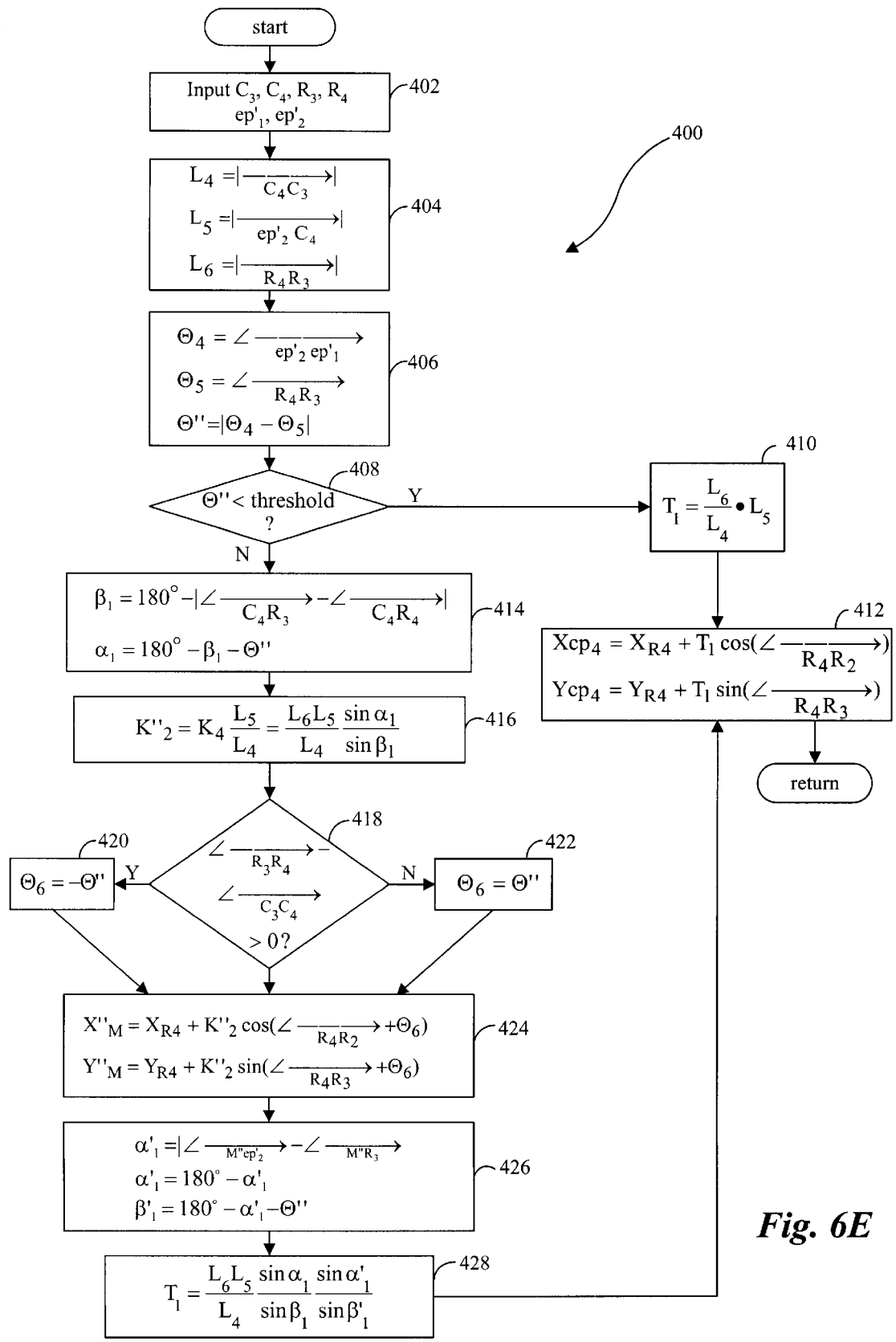
FIG. 6E is a flowchart of a subroutine in the first embodiment invoked to determine a second corner point $cp_4$ of the bottom bounding box of the symbology.
Figure 6F:
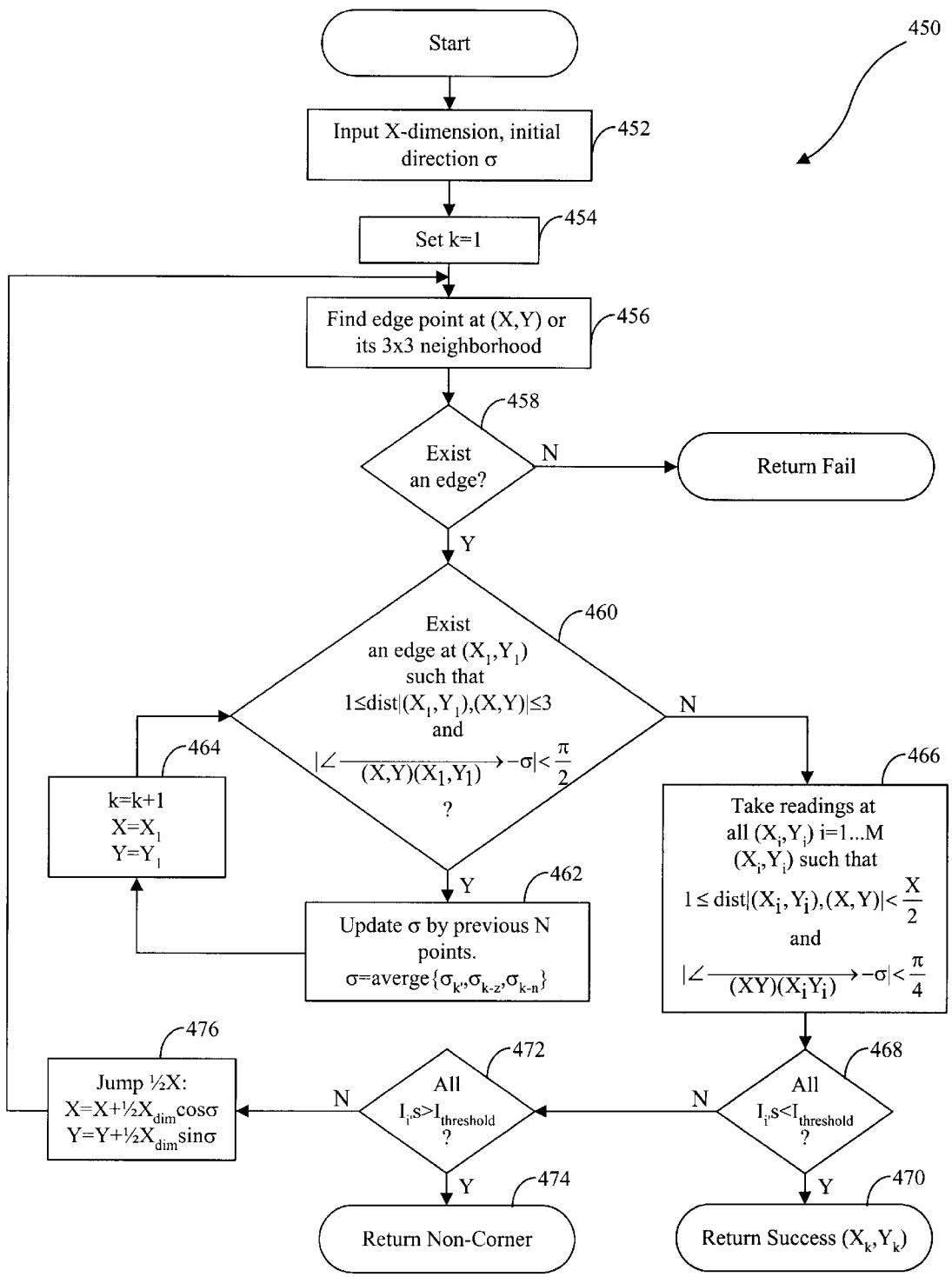
FIG. 6F is a flowchart of a subroutine in the first embodiment used to determine when a bar within either the first or second bounding box has been traversed.

Referring to FIG. 6F, initially in step 452 of subroutine 450, the processor 36 inputs the X-dimension of the symbol 24, which has been previously determined. The processor 36 in step 452 also inputs an initial direction of sampling σ which is dependent on which corner point (root) is being sought. Initially, the direction σ to determine corner point $C_1$(56) will be input. Next, in step 454, the processor 36 initializes a value k to 1 (k=1), where k represents the number of samples the processor 36 has made along the direction σ. In step 456, the processor 36 seeks an edge point at some point (x, y) or its neighborhood, preferably a 3×3 pixel neighborhood, in the Cartesian coordinate system, as is well known in the art and described in A. Rosenfeld, *Digital Picture Processing,* Academic Press, Volume 1 and Volume 2, 1982, incorporated by reference herein.

In step 458 the processor 36 determines if there is an edge within any of the 3×3 area checked, if not, then the processor 36 returns to the main routine 200 and indicates on a user display (not shown) that a failure has occurred. However, if the processor 36 found that an edge does exist, then it proceeds to step 460. In step 460 the processor 36 checks whether an edge exists at a next point $(x_1, y_1)$ out of the points in the 3×3 pixel area surrounding (x,y) that are stored in memory, and tests this point against conditions:

$$1 \leq \text{dist} |(x_1, y_1), (x,y)| \leq 3; \text{ and}$$

$$|\angle \overrightarrow{(x,y)(x_1,y_1)} - \sigma| < \pi/2$$

As used generally herein, the symbol $\angle\overrightarrow{(X,Y)(X_1,Y_1)}$ refers to the angle that a line $\overrightarrow{(X,Y)(X_1,Y_1)}$ (formed by points (X,Y) and $X_1, Y_1$) makes with respect to the X axis of the Cartesian coordinate system employed by the present invention. Additionally, "dist" refers to determining the distance between two points using the well-known distance formula recited below. If the edge of $(x_1, y_1)$ is between 1 and 3 pixels away, and the edge is not at a point less than 90° from the direction of travel σ, then the processor 36 proceeds to step 462.

In step 462, the processor updates the direction σ by a linking history of N previous points, where σ=the average of $\{\sigma_{k-1}, \sigma_{k-2}, \sigma_{k-N}\}$. Then, the processor 36, in step 464, increments k to k+1 and sets sampled point (x, y) to value $(x_1, y_1)$ and returns to step 460. However, if the conditions of step 460 are not met, then the processor 36 proceeds to step 466.

In step 466, the processor 36 takes sample readings at all $(x_i, y_i)$, where i=1, ... M, and where each $I(x_i, y_i)$ satisfies the condition:

$$1 \leq \text{dist}|(x_i, y_i)(x_1, y_1)| < \text{X-dimension}/2 \text{ and } |\angle\overrightarrow{(x,y)(x_1,y_1)} - \sigma| < \pi/4,$$

and stores them in its memory. As a result, the processor 36 detects and stores an intensity between 1 and less than one half an X-dimension distance that is not at a 45° or more angle from direction σ. Then, in step 468 the processor 36 compares all values $I(x_i, y_i)$ with a threshold intensity value $I_{threshold}$, and if all the intensities $I(x_i, y_i)$ are less than the $I_{threshold}$, then the processor 36 determines that a corner was reached and was not caused by an anomaly, but by a vertical reference bar 28. Thereafter, the processor 36 returns to the main program 200 in step 470 and displays corners coordinates $(x_k, y_k)$.

If all the measured intensities $I(x_i, y_i)$ are not less than the $I_{threshold}$, then the processor 36 proceeds to step 472. In step 472, the processor 36 compares all the measured intensities $I(x_i, y_i)$ with the threshold intensity $I_{threshold}$, and if all the intensities $I(x_i, y_i)$ exceed the threshold, then the processor 36 proceeds to step 474, returns to the main routine 200 and indicates on a display (not shown) that no corner was found. This display communicates to a user that the processor 36 is no longer taking samples along the bar it was traveling along, but is now sampling in a space or has left the recognition pattern 26. However, if at least some of the measured intensities $I(x_i, y_i)$ are less than or equal to the threshold intensity $I_{threshold}$, then the processor 36 proceeds to step 476.

In step 476 the processor 36 jumps one-half an X-dimension, by changing the value of x to $x=x+\frac{1}{2}X_{dim}\cos\sigma$ and the value of y to $y=y+\frac{1}{2}X_{dim}\sin\sigma$, then the processor 36 returns to step 456 and finds a new edge point. This allows the processor 36 to expand the scope of its search for the next edge point. The corner finding subroutine 450 continues until the processor 36 registers a success in finding the corner point $C_1$(56) or a failure is registered. Then, a new direction for locating $C_2$(72) is input into the processor 36 and the subroutine 450 is repeated as described above until the corner point $C_2$(72) is also located, or a failure is registered. Finally, the processor 36 returns to the main routine 200.

The processor 36 once returning to the main routine 200 in FIG. 6A, after determining both corner points (roots) $C_1$(56) and $C_2$(72), then proceeds to step 204. In step 204 the processor 36 sequentially inputs the direction of travel σ' (perpendicular to σ) and the corner points $C_1$(56) and $C_2$(72) and then follows the direction σ', along vertical reference bar 28 from $C_1$(56) and $C_2$(72) to inner corner points $r_1$(62) and $r_2$(76), respectively, by invoking the corner finding subroutine 450, which operates as described above. Once the processor 36, using subroutine 450, has determined the location of inner corner points $r_1$(62) and $r_2$(76), it then returns to the main routine 200 and proceeds to step 206. In step 206 the processor 36 computes the angle $\Theta_1$ by determining the angle that the path between the root $C_1$(56) and the inner corner $r_1$(62) makes with the Cartesian coordinate system used for retrieval of information, i.e., $\Theta_1 = \angle\overrightarrow{C_1 r_1}$. The processor 36 in step 206 also calculates $\Theta_2$, which is the angle the path between the root $C_2$(72) and the inner corner $r_2$(76) makes with the Cartesian coordinate system, i.e., $\Theta_2 = \angle\overrightarrow{C_2 r_2}$.

Figure 6G:
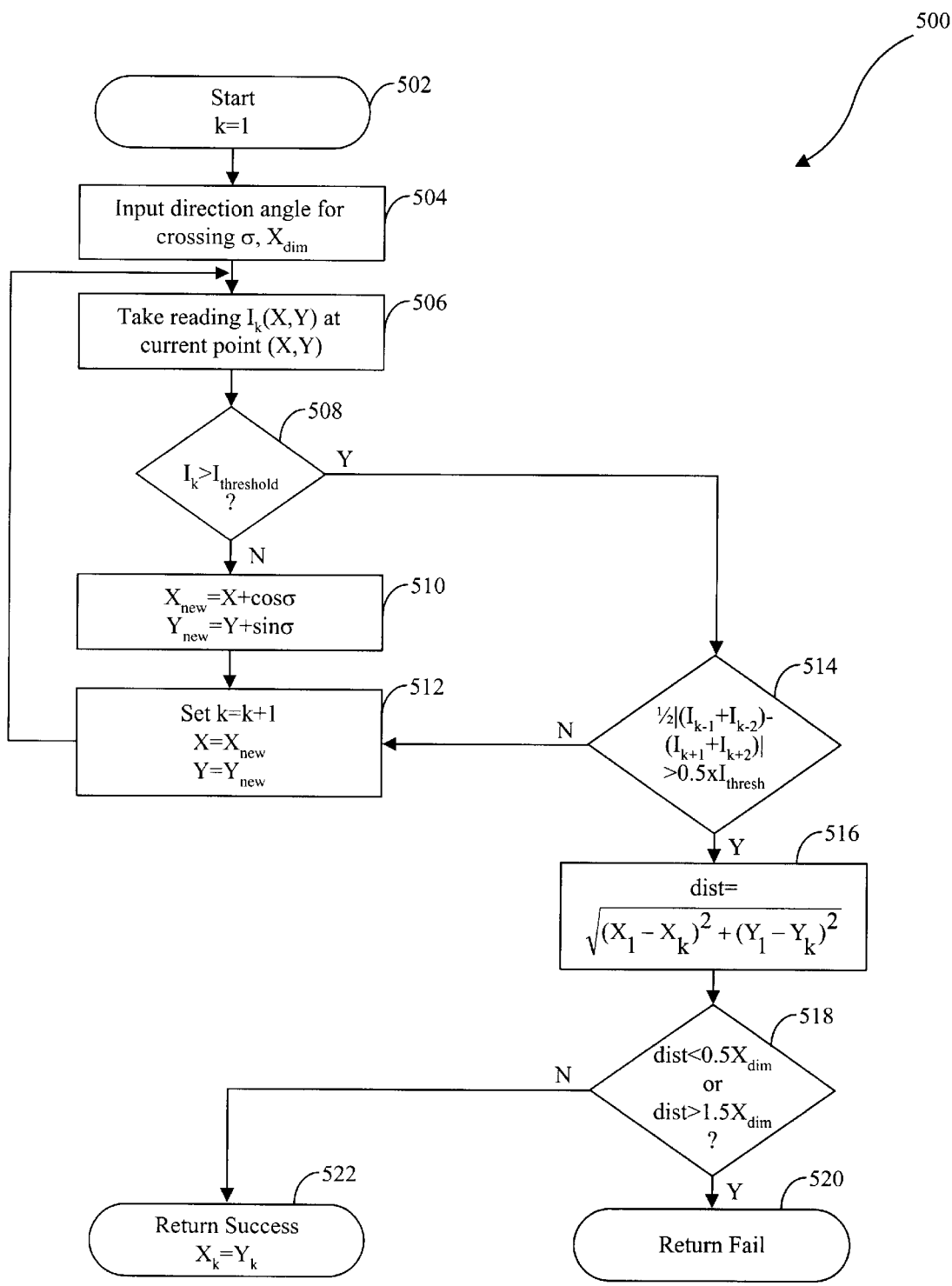
FIG. 6G is a flowchart of a subroutine in the first embodiment used to determine when a bar associated with the first or second bounding box has been traversed.

Once the processor 36 has located the inner corners $r_1$(62) and $r_2$(76), as well as their respective direction of travel, i.e., angles $\Theta_1$ and $\Theta_2$, with respect to the Cartesian coordinate system, it then proceeds to determine top points $R_1$(68) and $R_2$(78) in step 208 by invoking a bar crossing subroutine 500, shown in FIG. 6G.

Referring to FIG. 6G, in step 502 of the bar crossing subroutine 500, the processor 36 initializes a value k, which represents the number of samplings, i.e., the processor sets k=1. The subroutine 500 must be invoked twice by step 208 to find $R_1$(68) and $R_2$(78). When, for example, top point $R_1(68)$ is being determined, the processor 36 in step 504 recalls the direction σ and the X-dimension of the symbol 24 from memory, as well as the starting point, which is the corner $r_1(62)$. Next, in step 506, the processor 36 takes an intensity reading $I_k(x, y)$, and in step 508, the processor 36 compares $I_k(x, y)$ with a threshold intensity value $I_{threshold}$. If the stored intensity reading $I_k(x, y)$ does not exceed the threshold intensity level, then the processor 36 determines that the bar has not yet been crossed and proceeds to step 510.

In step 510 the processor 36 establishes new x and y coordinates as $x_{new}=x+\cos\sigma$ and $y_{new}=y+\sin\sigma$. Then, in step 512, the processor 36 sets the value $x=x_{new}$ and the value $y=y_{new}$ and increments k by one and moves to the new sampling point $I_k(x,y)$.

However, if in step 508 the processor 36 determines that the intensity reading $I_k(x, y)$ exceeds the threshold, and that there is a possibility that the bar has been crossed, then the processor 36 proceeds to step 514. In step 514 the processor 36 checks intensity levels at two previous points and at two points following the monitored intensity $I_k(x, y)$, and compares these values to a threshold intensity as follows:

$$\tfrac{1}{2}|(I_{k-1}+I_{k-2})-(I_{k+1}I_{k+2})|>0.5 \cdot I_{threshold}.$$

This extra step assists in determining if the bar has actually been crossed, or if some anomaly has been encountered. If the difference in intensities before and after the monitored point does not exceed the intensity threshold, then the monitored point is merely an anomaly due to reflection, damage to the symbol 24, etc. The processor 36 then calculates $x_{new}$ and $y_{new}$ as well as increments the value of k in step 512, as described above, and returns to step 506 in the subroutine.

However, if the difference in intensities is greater than the threshold, then it is likely that the foot 66 (i.e., the part of the reference bar 28 being traveled through in FIG. 5A) has been crossed. Thus, the processor 36 proceeds to step 516 to determine the distance of the point of crossing from the initially scanned point by using the equation:

$$dist = \sqrt{(x_l - x_k)^2 + (y_l - y_k)^2}$$

Finally, the processor 36 proceeds to step 518, where it compares the calculated distance (dist) with the X-dimension of the symbol. If the distance is either less than 50% of the X-dimension or more than 150% of the X-dimension, then the processor 36 determines that the calculated size of the foot 66 is too small or large to be correct, and it proceeds to step 520 where it returns to the main routine 200, and causes a display (not shown) to indicate that the attempt to locate the top point $R_1(66)$ has failed. If, however, the distance falls between 50% and 150% of the X-dimension, then the processor 36 proceeds to step 522 and returns to the main routine 200, where it stores successful $(x_k, y_k)$ coordinates for the position of the top point $R_1(68)$.

The procedure that the bar crossing subroutine 500 uses to determine the position of top point $R_2(78)$ is identical to that used to determine $R_1(68)$ except in step 504, the direction $\Theta_2$ is input, and the starting point for sampling begins at corner point $r_2(76)$.

After the processor 36 has determined the values of $R_1(66)$ and $R_2(78)$, it returns to main routine 200, as shown in FIG. 6A, and proceeds to step 210. In step 210, the processor 36 starting at roots $C_1(56)$ and $C_2(72)$ proceeds to travel along a direction 180° from $\Theta_1$ and $\Theta_2$ by a predetermined number of X-dimensions. The processor then searches the small area around the newly obtained point for an edge point. When the edge point is found, the processor invokes the corner finding subroutine 450 to find the location of lower roots $C_3(80)$ and $C_4(82)$, respectively. Since the processor 36 knows the version of the symbol 24, the processor knows how many bars must be crossed in the finder pattern 26 before locating the lower roots $C_3(80)$ and $C_4(82)$.

Then, in step 212, the processor 36 follows an edge of vertical reference patterns 28 from the lower roots $C_3(80)$ and $C_4(82)$ to lower inner corner points $r_3$ and $r_4$, respectively, by invoking the corner finding subroutine 450 (discussed above), as shown in FIG. 6F. In step 214, the processor 36, crosses the width of feet 92 and 94 from inner corners $r_3(88)$ and $r_4(90)$ to bottom points $R_3(96)$ and $R_4(98)$ by invoking the bar crossing subroutine 500 (described above), shown in FIG. 6G. Once the processor 36 has determined top points $R_1(68)$, $R_2(78)$, and bottom points $R_3(96)$ and $R_4(98)$, it proceeds to step 216, and invokes a first corner point subroutine 250, shown in FIG. 6B.

Referring to FIG. 6B, the processor 36 under the corner point subroutine 250 begins in step 252 and recalls and inputs the previously calculated values $C_1(56)$, $C_2(72)$, $R_1(68)$, $R_2(78)$, $ep_1(52)$, and $ep_2(54)$. Then, in step 254, the processor 36 determines a length $L_1$, as shown in FIG. 5B, by measuring the distance between the root $C_1(56)$ and the root $C_2(72)$. In step 254 the processor 36 also determines a length $L_2$ by measuring the distance between the root $C_1(56)$ and the end point $ep_1(52)$. Further, the processor 36 determines a length $L_3$, also shown in FIG. 5B, by measuring the distance between the top point $R_2(78)$ and the top point $R_1(68)$. The lengths $L_1$, $L_2$, and $L_3$ are determined by using the well-known distance formula recited above. The processor 36 then stores these lengths in its memory, and proceeds to step 256.

In step 256, the processor 36 calculates the angle Θ, which is the distortion of angular difference between a line connecting the end points of top long bar 50 of the symbol 24 and the line connecting the top points of the symbol. In a non-distorted symbol these lines would be parallel, but any existing angular difference between the lines must be compensated. Initially, in step 256, the processor 36 determines the angle $\Theta_1$, that a line connecting end points $ep_1(52)$ and $ep_2(54)$ makes with the Cartesian coordinate system of the image retrieval system. Then, the processor 36 determines the angle $\Theta_2$ that a line connecting top points $R_1(68)$ and $R_2(78)$ makes with the Cartesian coordinate system. Finally, the processor 36 subtracts $\Theta_1$ from $\Theta_2$ to determine the angular difference Θ, i.e., $\Theta=|\Theta_1-\Theta_2|$. The values of $\Theta_1$, $\Theta_2$ and Θ are then stored in the memory of the processor 36.

In step 258, the processor 36 compares the angular difference Θ with some predetermined threshold. The threshold angular value is some angle that will allow a simplified calculation to approximate a corner point if it is not exceeded. If the processor 36 finds that the angular difference Θ is less than the threshold value, then it proceeds to step 260, where, using a "short cut" method, the processor 36 determines a length T, which is the distance between top point $R_1(68)$ and first corner point $cp_1(100)$. The value of T is approximated by a calculation $$T = \frac{L_3}{L_1} \cdot L_2.$$

Then, in step 262, the processor 36 uses the value T to determine the X coordinate of the corner point $cp_1(100)$ using the equation:

$$Xcp_1 = X_{R1} + T\cos(\angle \overrightarrow{R_2R_1}).$$

The Y coordinate of the corner point $cp_1(100)$ is also determined in step 262 using the equation:

$$Ycp_1 = Y_{R1} + T\sin(\angle \overrightarrow{R_2R_1}).$$

The processor 36 then returns to the main routine 200, as shown in FIG. 6A.

If, however, in step 258, the processor 36 determines that the angular difference $\Theta$ is not less than the predetermined threshold value, then the processor 36 proceeds to step 264. In step 264, the processor 36 determines an angle $\beta$ between the line connecting root $C_2(72)$ and top point $R_2(78)$ and a line 116 exactly parallel to the line connecting root $C_2(72)$ and root $C_1(56)$ as calculated in the equation:

$$\beta = |\angle \overrightarrow{C_2R_2} - \angle \overrightarrow{C_2C_1}|.$$

Then, an angle $\alpha$, which is the angle between the line connecting root $C_2(72)$ and top point $R_2(78)$ and the line connecting top point $R_2(78)$ and top point $R_1(68)$, is calculated by processor 36 in step 266 using the equation:

$$\alpha = 180° - \beta - \Theta.$$

In step 268, the processor 36 calculates a length $K_2$ from top point $R_1(68)$ to a point M(118), which is where the corner point $cp_1$ would be if there were no distortion of the symbol 24. A length $K_2$, equals the distance between the point $R_1$ and a point $R'_2$ as shown in FIG. 5B. To determine the value of $K_2$, the processor 36 uses the following equation:

$$K_2 = K_1 \frac{L_2}{L_1} = \frac{L_3 L_2}{L_1} \cdot \frac{\sin\alpha}{\sin\beta}$$

In step 270, the processors 36 checks to see if the angular difference between the line connecting top points $R_2(78)$ and $R_1(68)$ and the line connecting roots $C_2(72)$ and $C_1(56)$ is greater than zero. If it is, then the processor 36 sets a value $\Theta_3$ equal to $-\Theta$ in step 272; however, if the processor 36 determines that the angular difference is not greater than zero, then the processor 36 sets the value $\Theta_3$ equal to $\Theta$ by branching to step 274 instead. Next, in step 276, a point M(118) shown in FIG. 5B, is calculated by the processor 36.

The X position of the point M(118) along the X axis on the Cartesian coordinate system is calculated by the processor 36 using the equation:

$$X_M = X_{R1} + K_2 \cos(\angle \overrightarrow{R_2R_1} + \Theta_3).$$

The Y position of the point M(118) on the Y axis of the Cartesian coordinate system is calculated by the processor 36 using the equation:

$$Y_M = X_R + K_2 \sin(\angle \overrightarrow{R_2R_1} + \Theta_3)$$

The processor 36 next determines the inner angles of a triangle 120, shown in FIG. 5B, to assist in calculating the value T, discussed above. First, the processor 36 calculates a value $\alpha'$ using the equation:

$$\alpha' = |\overrightarrow{M_{ep1}} - \angle \overrightarrow{MR_1}|$$

where the angle $\alpha'$ is the difference between the angles of the line connecting the point M(118) and the end point $ep_1(52)$ and the line connecting the point M(118) and the top point $R_1(68)$ as shown in FIG. 5B. Next, the processor 36 in step 280 calculates an angle $\beta'$ using the equation:

$$\beta' = 180° - \alpha' - \Theta.$$

After the angles $\alpha'$ and $\beta'$ have been calculated, the value of T, which is the line connecting top point $R_1(68)$ with the first corner point $cp_1(100)$, is approximated by the processor 36 in step 282 with the following equation:

$$T = K_1 = \frac{L_3 L_2}{L_1} \cdot \frac{\sin\alpha}{\sin\beta} \cdot \frac{\sin\alpha'}{\sin\beta'}.$$

Once the value of T has been calculated, the processor 36 proceeds to step 262, discussed above, and calculates the x and y coordinates of the first corner point $cp_1(100)$. After the first corner point $cp_1(100)$ has been located, the processor 36 returns to main routine 200, shown in FIG. 6A.

The processor 36, after completing the first corner point subroutine 250, shown in FIG. 6B, and calculating the position of the first corner point $cp_1(100)$ proceeds to step 218 in the main routine 200, shown in FIG. 6A. In step 218, the processor 36 invokes a second corner point subroutine 300, shown in FIG. 6C, to locate the position of the corner point $cp_2$, as shown in FIG. 5C.

Referring to FIG. 6C, initially, in step 302, the processor 36 recalls from its memory and inputs the previously calculated values of the roots $C_2(72)$, and $C_1(56)$, as well as the top points $R_1(68)$ and $R_2(78)$, and the end points $ep_2(54)$ and $ep_1(52)$. In step 304, the processor 36 determines a length $L'_1$, as shown in FIG. 5C, by measuring the distance between the root $C_1(56)$ and the root $C_2(72)$. In step 304, the processor 36 also determines a length $L'_2$, shown in FIG. 5C, by measuring the distance between the root $C_2(72)$ and the end point $ep_2(54)$. Furthermore, the processor 36 determines a distance $L'_3$, shown in FIG. 5C, by measuring the distance between the top point $R_2(78)$ and the top point $R_1(68)$. The processor 36 then stores the lengths $L'_1$, $L'_2$ and $L'_3$ in its memory, and proceeds to step 306.

In step 306, the processor 36 calculates an angle $\Theta'$, which is the angular difference or distortion between a line connecting the end points $ep_2(54)$ and $ep_1(52)$ of the symbol 24 and a line connecting top points $R_1(68)$ and $R_2(78)$. In a non-distorted symbol, these lines should be parallel, but any angular difference between the lines must be compensated for. Initially, in step 306, the processor 36 determines the angle $\Theta'_1$ that a line connecting the end points $ep_1(52)$ and $ep_2(54)$ makes with the Cartesian coordinate system of the image retrieval system. Then, the processor 36 determines the angle $\Theta'_2$ that a line connecting the top points $R_1(68)$ and $R_2(78)$ makes with the Cartesian coordinate system. Finally, the processor 36 subtracts $\Theta'_1$ from $\Theta'_2$ to determine the angular difference $\Theta'$, i.e., $\Theta' = |\Theta'_1 - \Theta'_2|$. The values of $\Theta'_1$, $\Theta'_2$, and $\Theta'$ are then stored in the memory of the processor 36.

In step 308, the processor 36 compares the angular difference $\Theta'$ with a predetermined threshold. The threshold angular value is an angle that will allow a simplified calculation to approximate a corner point if it is not exceeded. If the processor 36 finds that the angular difference Θ' is less than the threshold value, then it proceeds to step 310, where, using a "short cut" method, the processor 36 determines a length T', which is the distance between the top point $R_2$(78) and the second corner point $cp_2$(102). The value of T' is approximated by calculating:

$$T' = \frac{L'_3}{L'_1} \cdot L'_2$$

Then, in step 312, the processor 36 uses the value T' to determine the X coordinate of the corner point $cp_2$(102) using the equation:

$$Xcp_2 = X_{R2} + T'\cos(\angle \overrightarrow{R_1R_2}),$$

and the Y coordinate of the second corner point $CP_2$(102) using the equation:

$$Ycp_2 = Y_{R2} + T'\sin(\angle \overrightarrow{R_1R_2}).$$

The processor 36 then returns to the main routine 200, as shown in FIG. 6A.

If in step 308, the processor 36 determines that the angular difference Θ' is not less than the predetermined threshold value, then the processor 36 proceeds to step 314. In step 314, the processor 36 determines an angle β" between a line connecting the root $C_1$(56) with the top point $R_1$(68) and a line 122 parallel to the line connecting end points $ep_2$(74) and $ep_1$(52). The value of the angle β" is calculated by the equation:

$$\beta'' = 180° - |\angle \overrightarrow{C_1C_2} - \angle \overrightarrow{C_1R_1}|.$$

Then, in step 314 the processor 36 calculates an angle α", which is the angle between the line connecting the point $C_1$(56) and the top point $R_1$(68), and the line connecting the top points $R_2$(78) and $R_1$(68), using the equation:

$$\alpha'' = 180° - B'' - \Theta'.$$

In step 316, the processor 36 calculates a length $K'_2$ from the top point $R_2$(78) to a point M', which is where the corner point $cp_2$ would be if there were not distortion of the symbol 24. The processor 36 uses the following equation to determine the value of $K'_2$, where:

$$K'_2 = K'_1 \cdot \frac{L'_2}{L'_1} = \frac{L'_3 L'_2}{L'_1} \cdot \frac{\sin\alpha''}{\sin\beta''}.$$

In step 318 the processor 36 checks to see if the angular difference between the line connecting top points $R_2$(78) and $R_1$(68) and the line connecting roots $C_2$(72) and $C_1$(56) is greater than zero. If the processor 36 determines that the angular difference is greater than zero, then it sets the value $\Theta'_3$ equal to $-\Theta'$, in step 320. However, if the processor 36 determines that this difference is not greater than zero, then the processor 36 proceeds to step 322 and sets the value $\Theta'_3$ equal to $\Theta'$.

Next, in step 324, the processor 36 calculates a position M'. The position of M' along the X axis on the Cartesian coordinate system is calculated by the processor 36 using equation:

$$X'_M = X_{R2} + K'_2\cos(\angle \overrightarrow{R_1R_2} + \Theta'_3).$$

The position of M' on the Y axis of the Cartesian coordinate system is calculated by the processor 36 using the equation:

$$Y'_M = Y_{R2} + K'_2\sin(\angle \overrightarrow{R_1R_2} + \Theta'_3).$$

The processor 36 next determines the inner angles of triangle 124 shown in FIG. 5C, to assist in calculating the value T', discussed above. First, the processor 36, in step 326, calculates α'" using the equation:

$$\alpha''' = |\angle \overrightarrow{M'ep_2} - \angle \overrightarrow{M'R_1}|.$$

Here, α'" is the difference between the angles of the line connecting the point M'(126) and the end point $ep_2$(54) and the line connecting the point M'(126) and the top point $R_2$(78), as shown in FIG. 5C. The processor 36, in step 326, calculates β'" using the equation:

$$\beta''' = 180° - \alpha''' - \Theta'.$$

After these angles have been calculated, the value of T', which is the line connecting the top point $R_2$(78) and the corner point $cp_2$(102), is calculated by the processor 36 in step 328 with the equation:

$$T' = \frac{L'_3 L'_2}{L'_1} \cdot \frac{\sin\alpha''}{\sin\beta''} \cdot \frac{\sin\alpha'''}{\sin\beta'''}.$$

Once the processor 36 calculates the value of T', it then proceeds to step 312, discussed above and uses it to calculate the X and Y coordinates $Xcp_2$ and $Ycp_2$ of the second corner point $cp_2$(102). After the second corner point has been located, the processor 36 returns to main routine 200, shown in FIG. 6A.

The processor 36, after completing the second corner point subroutine 300, shown in FIG. 6C, and calculating the position of the second corner point $cp_2$(102), proceeds to step 220 in the main routine 200, shown in FIG. 6A. In step 220, the processor 36 begins to locate the end points of the lower bounding box 70, shown in FIG. 5A. First, the processor 36 locates the position of the end point $ep'_1$(106) along the X axis of the Cartesian coordinate system used to retrieve information from the image, using equation:

$$Xep'_1 = Xep_3 + X\cos(\angle \overrightarrow{ep_4ep_3}).$$

Recall, the coordinates (and thus the X and Y positions) of the end points $ep_1$ and $ep_2$ were input in step 201. The processor 36 also locates the position of the end point $ep_1$(106) along the Y axis of the Cartesian coordinate system using equation:

$$Yep'_1 = Yep_3 + X\sin(\angle \overrightarrow{ep_4ep_3}).$$

The processor 36 next proceeds to step 222, where it locates the second lower end point $ep'_2$(64), shown in FIG. 5A. First, the processor 36 locates the position of the end point $ep'_2$(104) along the X-axis of the Cartesian coordinate system using equation:

$$Xep'_2 = Xep_4 + X\cos(\angle \overrightarrow{ep_3ep_4}).$$

Then, the processor 36 locates the position of the end point $ep'_2$(104) along the Y axis of the Cartesian coordinate system using equation:

$$Yep'_2 = Yep_4 + Y\sin(\angle \overrightarrow{ep_3 ep_4}).$$

Once the processor 36 has located the end points of the lower bounding box 70 of the symbol 24, it proceeds to step 224, where it determines the position of the corner point cp$_4$(110) of the lower bounding box 70, shown in FIG. 5A, by invoking a third corner point subroutine 400, shown in FIG. 6E.

Referring to FIG. 6E, in step 402 of the subroutine 400, the processor 36 recalls and inputs the position of the previously calculated points C$_3$(80), C$_4$(82), R$_3$(96), R$_4$(98), ep'$_1$(106) and ep'$_2$(104). Then, in step 404, the processor 36 determines a length L$_4$, as shown in FIG. 5D, by measuring the distance between the root C$_4$(82) and the root C$_3$(80). Further, in step 404, the processor 36 determines a length L$_5$ by measuring the distance between the end point ep'$_2$(104) and the root C$_4$(82). The processor 36 also determines a length L$_6$, also shown in FIG. 5D, by measuring the distance between the bottom points R$_4$(98) and R$_3$(96). The processor 36 then stores the lengths L$_4$, L$_5$ and L$_6$ in its memory, and proceeds to step 406.

In step 406, the processor 36 calculates an angle $\Theta''$, which is the angular difference or distortion between a line parallel to the line connecting the bottom end points ep'$_1$(106) and ep'$_2$(104) and a line connecting the bottom points R$_4$(98) and R$_3$(96). In a non-distorted symbol, these lines would be parallel. Thus, for proper decoding of the symbol 24, any angular distortion must be compensated for. Initially, in step 406, the processor 36 determines an angle $\Theta_4$ that a line connecting end points ep'$_2$(104) and ep'$_1$(106) makes with the Cartesian coordinate system of the image retrieval system. Then, the processor 36 determines an angle $\Theta_5$ that a line connecting the bottom points R$_4$(98) and R$_3$(96) makes with the Cartesian coordinate system. Finally, the processor 36 subtracts the angle $\Theta_5$ from the angle $\Theta_4$, and the absolute value of this difference is the angular difference $\Theta''$, i.e., $\Theta'' = |\Theta_4 - \Theta_5|$. The values of $\Theta_4$, $\Theta_5$ and $\Theta''$ are then stored in the memory of the processor 36. The processor 36 then proceeds to step 408.

In step 408, the processor 36 compares the angular difference $\Theta''$ with a predetermined threshold. If the threshold angular value is not exceeded then the processor 36 may use a simplified calculation to approximate the corner point under consideration. If the processor 36 finds that the angular difference $\Theta''$ is less than the threshold value, then it proceeds to step 410, where, using a "short cut" method, the processor 36 determines a length T$_1$, which is the distance between bottom points R$_4$(98) and fourth corner point cp$_4$(110). The value of T$_1$ is approximated by calculating:

$$T_1 = \frac{L_6}{L_4} \cdot L_5.$$

The processor 36 then proceeds to step 412, where it uses the value T$_1$ to determine the X-coordinate of the corner point cp$_4$(110) using the equation:

$$Xcp_4 = Y_{R4} + T_1 \cos(\angle \overrightarrow{R_4 R_3}).$$

The Y coordinate of the corner point cp$_4$(110) is determined using the equation:

$$Ycp_4 = Y_{R4} + T_1 \sin(\angle \overrightarrow{R_4 R_3}).$$

The processor 36 then returns to the main routine 200, as shown in FIG. 6A.

However, if in step 408, the processor 36 determines that the angular difference $\Theta''$ is not less than the predetermined threshold value, then the processor 36 proceeds to step 414. In step 414, the processor 36 determines an angle $\beta_1$ which is calculated by the equation:

$$\beta_1 = 180° - |\angle \overline{C_4 C_3} - \angle \overline{C_4 R_4}|$$

Then, the processor 36 determines an angle $\alpha_1$, using the equation:

$$\beta_1 180° - \beta_1 - \Theta''.$$

In step 416, the processor 36 calculates a length $K''_2$ from the bottom point R$_4$(98) to a point M'', which is where the corner point would be if there were no distortion of the symbol 24. The processor 36 uses the following equation to determine the value of $K''_2$ as follows:

$$K''_2 = R_4 \frac{L_5}{L_4} = \frac{L_6 L_5}{L_4} \cdot \frac{\sin \alpha_1}{\sin \beta_1}.$$

In step 418, the processor 36 checks to see if the angular difference between the line connecting the bottom points R$_3$(96) and R$_4$(98) and the line connecting the points of the roots C$_3$(80) and C$_4$(82) is greater than zero. If the distance is greater than zero, then the processor 36 sets a value $\Theta_6$ equal to $-\Theta''$ in step 420. However, if the processor 36 determines that the angular difference is not greater than zero, then the processor 36 sets the value $\Theta_6$ equal to $\Theta''$. Next, in step 424, the position M''(130), shown in FIG. 5D is calculated by the processor 36. The position of M'' along the X axis of the Cartesian coordinate system is calculated by the processor 36 using the equation:

$$Xm'' = X_{R4} + K''_2 \cos(\angle \overrightarrow{R_4 R_3} + \Theta_6).$$

The position of M'' along the Y axis of the Cartesian coordinate system is calculated using the equation:

$$Ym'' = Y_{R4} + K''_2 \sin(\angle \overrightarrow{R_4 R_3} + \Theta_6).$$

The processor 36 next proceeds to step 426, where it determines the inner angles of a triangle 132 shown in FIG. 5D to assist in calculating the value of T$_1$, discussed above. First, the processor 36 calculates an angle $\alpha'_1$ using the equation $\alpha'_1 = |\angle \overrightarrow{M'' ep'_2} - \angle \overrightarrow{M'' R_3}|$. In other words the angle $\alpha'_1$ is the difference between the angles of the line connecting the point M''(130) and the end point ep'$_2$(104) and the line connecting the point M''(130) and the bottom point R$_3$(96) as shown in FIG. 5D. The processor 36 in step 426 calculates $\beta'_1$ using equation:

$$\beta'_1 = 180° - \alpha'_1 - \Theta''.$$

After these angles have been calculated, the processor 36, in step 428, calculates the value of T$_1$, which is the length of line connecting the bottom point R$_4$(98) with the fourth corner point cp$_4$(110), with the following equation:

$$T_1 = \frac{L_6 L_5}{L_4} \cdot \frac{\sin\alpha_1}{\sin\beta_1} \cdot \frac{\sin\alpha'_1}{\sin\beta'_1} .$$

Once the value of $T_1$ has been calculated, the processor 36 proceeds to step 412, discussed above, and calculates the X and Y coordinates $Xcp_4$ and $Ycp_4$ of the fourth corner point $cp_4$(110). After the position of the fourth corner point $cp_4$(110) has been computed, the processor 36 returns to the main routine 200, shown in FIG. 6A.

The processor 36, after completing the subroutine 400, shown in FIG. 6E and calculating the position of the corner point $cp_4$(110), proceeds to step 226, shown in FIG. 6A. In step 226, the processor 36 invokes a fourth corner point subroutine 350, shown in FIG. 6D, to locate the corner point $cp_3$(108). Referring to FIG. 6D, in step 352, the processor 36 recalls from its memory and inputs the previously calculated values of roots $C_4$(82), and $C_3$(80), as well as bottom points $R_4$(98) and $R_3$(96), and end points $ep'_2$(104) and $ep'_1$(106). In step 354, the processor 36 determines a length $L'_4$, as shown in FIG. 5E, by measuring the distance between the root $C_4$(82) and the root $C_3$(80). In step 354, the processor 36 also determines a distance $L'_5$, shown in FIG. 5E, by measuring the distance between the root $C_3$(80) and the end point $ep'_1$(106). The processor 36 also determines a distance $L'_6$, shown in FIG. 5E, by measuring the distance between the bottom points $R_3$(96) and $R_4$(98). The processor 36 then stores these lengths in its memory, and proceeds to step 356.

In step 356, the processor 36 calculates an angle $\Theta'''$, which is the angular difference or distortion between a line connecting the end points of the symbol 24, and a line connecting the bottom points $R_3$(96) and $R_4$(98). Initially, in step 356, the processor 36 determines the angle $\Theta'_4$ that a line connecting the end points $ep'_2$(104) and $ep'_1$(106) makes with the Cartesian coordinate system of the image retrieval system. Then, the processor 36 determines an angle $\Theta'_5$ that a line connecting the bottom points $R_4$(98) and $R_3$(96) makes with the Cartesian coordinate system. Finally, the processor 36 subtracts the angle $\Theta'_4$ from the angle $\Theta'_5$ to determine an angular difference angle $\Theta'''$, i.e., $\Theta''' = |\Theta'_4 - \Theta'_1|$. The values of $\Theta'_4$, $\Theta'_5$, and $\Theta'''$ are then stored in the memory of the processor 36, and it proceeds to step 358.

In step 358, the processor 36 compares the angular difference angle $\Theta'''$ with the predetermined threshold. Recall, the threshold angular value is some angle that will allow a simplified calculation to approximate a corner point if it is not exceeded. If the processor 36 finds that the angular difference $\Theta'''$ is less than the threshold value, then it proceeds to step 360, where using a "short cut" method, the processor 36 determines a length $T_2$, which is the distance between the bottom point $R_3$(96) and the third corner point $cp_3$(108). The value of $T_2$ is approximated by the calculation:

$$T_2 = \frac{L'_6}{L'_4} \cdot L'_5.$$

Then, in step 362, the processor 36 uses the value $T_2$ to determine the X coordinate of the corner point $cp_3$(108) using the equation:

$$Xcp_3 = X_{R3} + T\cos(\angle \overline{R_3 R_4}).$$

Also, in step 362 the processor determines the Y coordinate of the third corner point $cp_3$(108) using the equation:

$$Ycp_3 + Y_{R3} + T_2 \sin(\angle \overline{R_3 R_4}).$$

The processor 36 then returns to the main routine 200, as shown in FIG. 6A. If, however, in step 358, the processor 36 determines that the angular difference $\Theta'''$ is not less than the predetermined threshold value, then the processor 36 proceeds to step 364.

In step 364, the processor 36 determines an angle $\beta_2$ between a line connecting the root $C_3$(80) and the bottom point $R_3$(96) and a line 136 parallel to the line connecting the roots $C_3$(80) and $C_4$(82). The value of the angle is calculated by the processor 36 using the equation:

$$\beta_2 = |\angle \overline{C_3 R_3} - \angle \overline{C_3 C_4}|.$$

Then, in step 366, the processor 36 calculates the angle $\alpha_2$, which is the angle between the line connecting the root $C_4$(82) and the bottom point $R_4$(98) and the line connecting the bottom points $R_3$(96) and $R_4$(98), using the equation:

$$\alpha_2 = 180° - \beta_2 - \Theta'''.$$

In step 368, the processor 36 calculates a length $K'''_2$ from the bottom point $R_3$(96) to a point $M'''$(137), which is where the corner point $cp_3$(108) would be if there were no distortion of the symbol 24. The processor 36 uses the following equation to determine the value of $K'''_2$, where:

$$K'''_2 = R_3 \frac{L'_5}{L'_4} = \frac{L'_6 L'_5}{L'_4} \cdot \frac{\sin\alpha_2}{\sin\beta_2} .$$

In step 370, the processor 36 checks to see if the angular difference between the line connecting bottom points $R_3$(96) and $R_4$(98) and the line connecting roots $C_3$(80) and $C_4$(82) is greater than zero. If the processor 36 determines that the angular difference is greater than zero, then it sets value $\Theta_7$ equal to $-\Theta'''$ in step 372. However, if the processor 36 determines that this difference is not greater than zero, then the processor 36 proceeds to step 374 and sets the value $\Theta_7$ equal to $\Theta'''$. Next, in step 376, the processor 36 calculates the position $M'''$(137). The position of $M'''$(137) along the X-axis of the Cartesian coordinate system is calculated by the processor 36 using the equation:

$$Xm''' = X_{R3} + K'''_2 \cos(\angle \overline{R_3 R_4} + \Theta_7).$$

The position of $M'''$(137) on the Y-axis of the Cartesian coordinate system is calculated by the processor 36 using the equation:

$$Ym''' = y_{R3} + K'''_2 \sin(\angle \overline{R_3 R_4} + \Theta_7).$$

The processor 36 next determines the inner angles of a triangle 138, shown in FIG. 5E, to assist in calculating the value $T_2$, discussed above. First, the processor 36, in step 378 calculates $\alpha'_2$ using the equation:

$$\alpha'_2 = |\angle \overline{M'''ep'_2} - \angle \overline{M'''R_4}|$$

Next, the processor 36, in step 380, calculates $\beta'_2$ using the equation:

$$\beta'_2 = 180° - \alpha'_2 - \Theta'''.$$

After these angles have been calculated, the value of $T_2$, which as stated above, is the line connecting the bottom point $R_3(98)$ and the corner point $cp_3(108)$, is calculated by the processor 36 in step 382 with equation:

$$T_2 = \frac{L'_6 L'_5}{L'_4} \cdot \frac{\sin\alpha_2}{\sin\beta_2} \cdot \frac{\sin\alpha'_2}{\sin\beta'_2}.$$

Once the processor 36 calculates the value of $T_2$, it then proceeds to step 362, discussed above, and uses it to calculate the X and Y coordinates $Xcp_3$ and $Ycp_3$ of the corner point $cp_3(108)$.

After the final corner point has been found, the processor 36 returns to main routine 200, stores the positions or values of the points $ep_1(52)$, $cp_1(100)$, $cp_2(102)$, and $ep_2(74)$, which define the upper bounding box 60 and values of the points $ep'_1$, $cp_3$, $cp_4$ and $ep'_2$, which define the lower bounding box 70. All recoverable information in the data cells of the symbol 24 lie within these two bounding boxes, and the processor 36 realigns and compensates its manner of information retrieval via the image using the Cartesian coordinate system in conjunction with a compensating algorithm well known in the art. Thereafter, the processor 36 can decode the retrieved data from the data cells in the symbol 24. Once all the above-mentioned bounding box data have been retrieved, stored, and decoded, the main routine ends, until a new image of a symbology is stored, or the processor independently requests a recalculation of the dimensions of the bounding boxes.

Figure 7A:
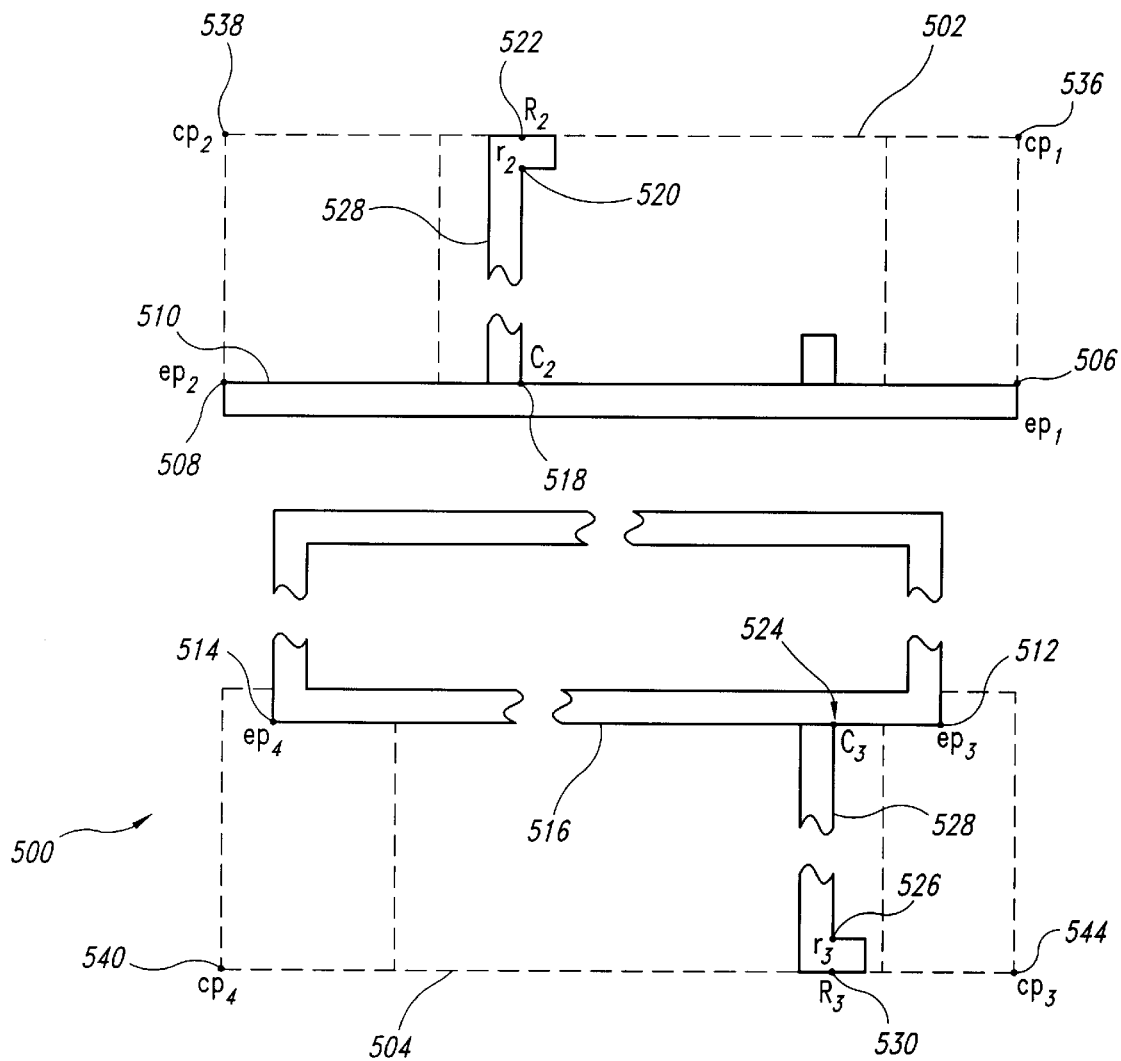
FIG. 7A shows a recognition pattern and the vertical reference patterns of version A and version B Code One symbols.
Figure 8A:
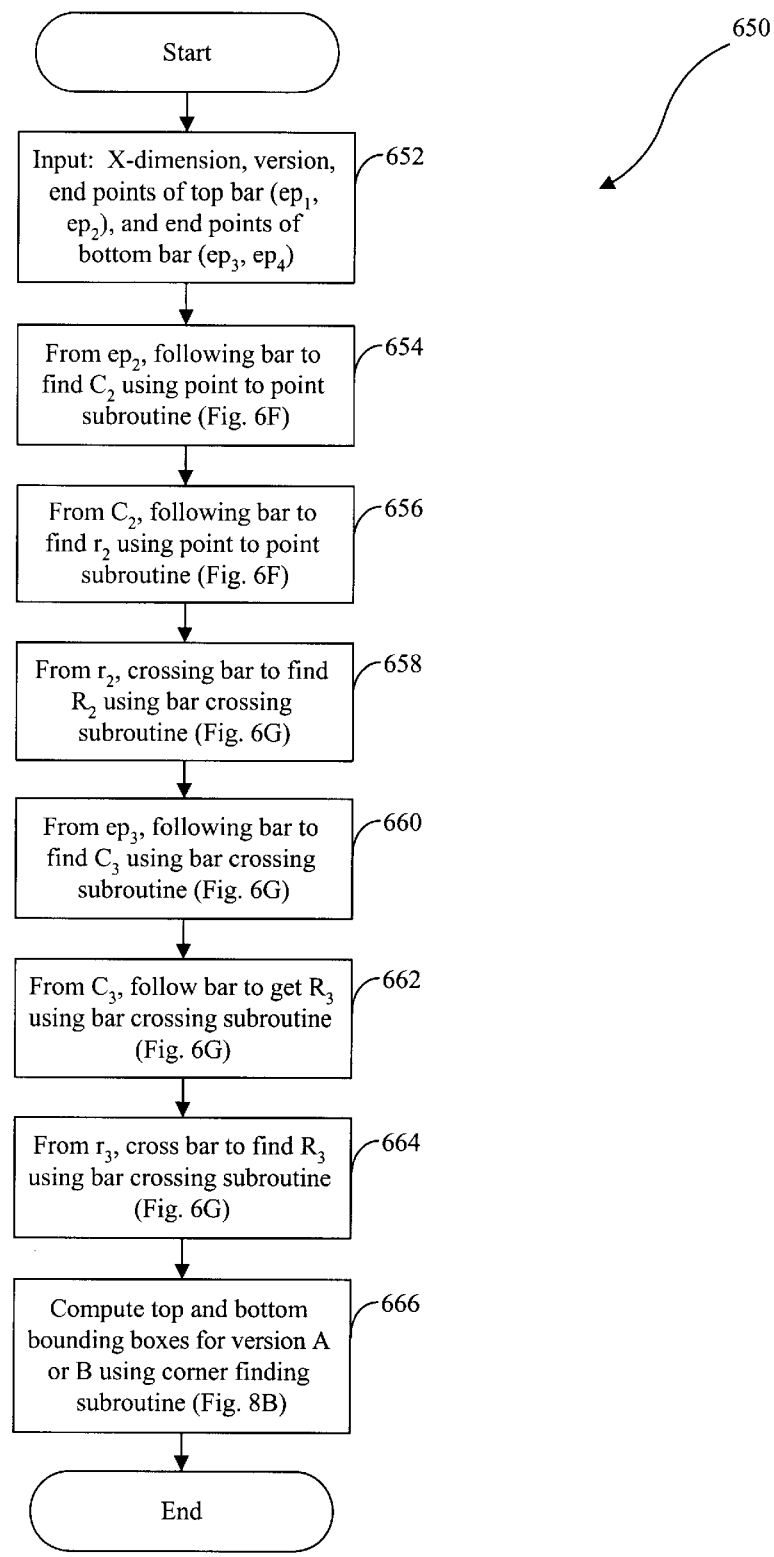
FIG. 8A is a flowchart which shows a main program implementing a method of determining the dimensions of the bounding boxes of the version A and version B symbols, in the second embodiment.
Figure 8B:
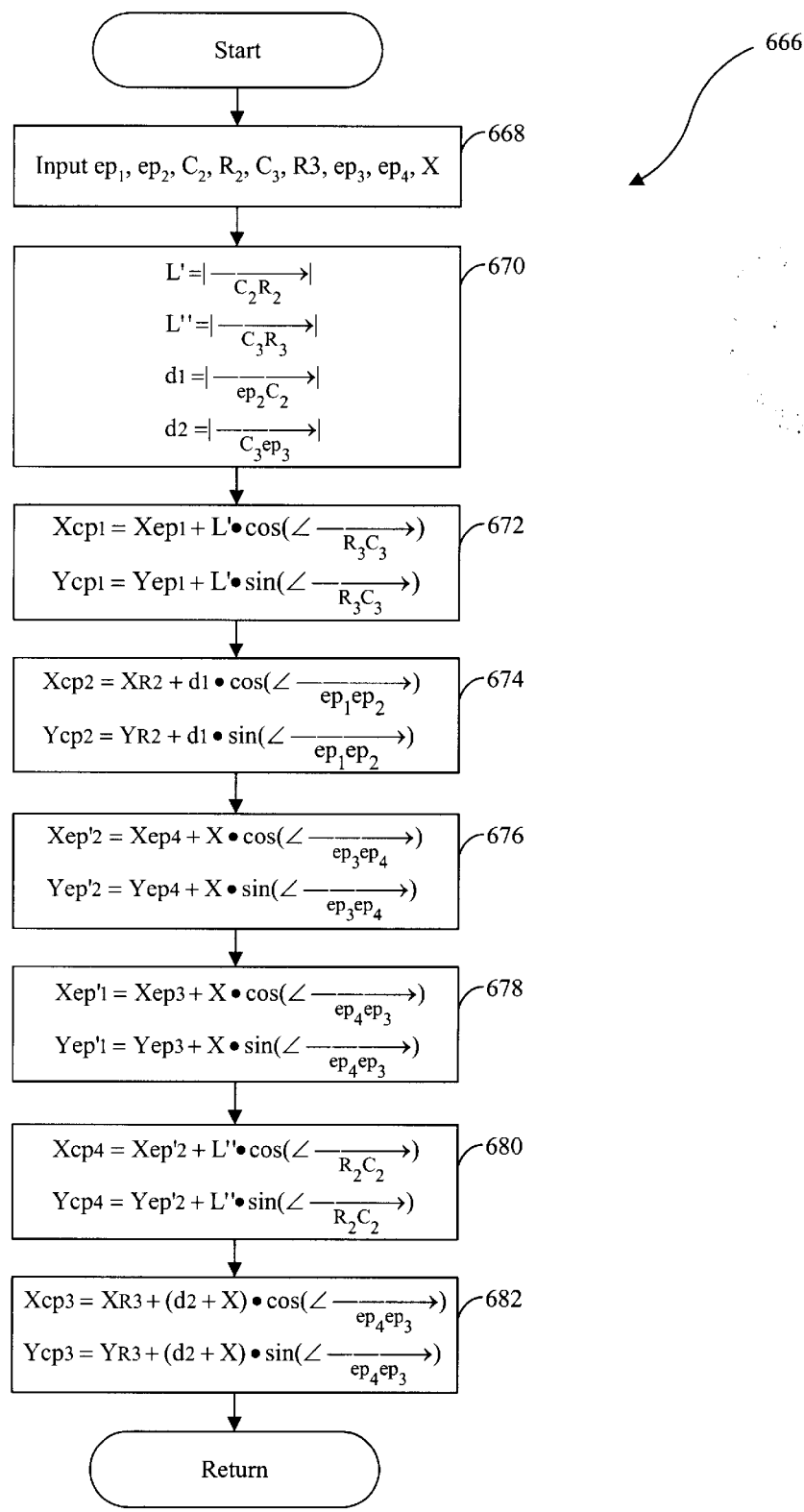
FIG. 8B is a flowchart of a subroutine in the second embodiment invoked to compute corner points of the bounding boxes of the symbology.

Some symbols have only one vertical reference pattern 28 for a given bounding box, such as versions A and B in the Code One symbology. For a symbol 500 only having one vertical reference pattern 528 per bounding box, as shown in FIG. 7A, an alternative embodiment is necessary to determine upper and lower bounding boxes 502, and 504, respectively. In the alternative embodiment, the processor 36 determines bounding boxes particularly for version A and version B Code One symbologies, which have only one vertical reference pattern 28. This is accomplished using software that is stored as a series of program instructions in the memory of the processor 36. Flowcharts from which a source code can be written by one skilled in the art are illustrated in FIGS. 8A and 8B. The alternative embodiment is similar to the previously described embodiment. Therefore, only the significant differences between the previously described embodiment and the alternative embodiment will be described herein.

Referring to FIG. 8A, a main routine 650, which is executed by processor 36, begins in step 652 by inputting to the processor 36 an X-dimension of the symbol 500. Also input are the version of the symbol 500, end points $ep_1(506)$ and $ep_2(508)$ of a top bar 510 and end points $ep_3(512)$ and $ep_4(514)$ of a bottom bar 516, all of which are shown in FIG. 7A and which can be independently input by an operator or determined by the processor 36 using an edge finding method discussed above. The processor then proceeds to step 654.

In step 654, the processor 36 follows a top of the top long bar 510 until it determines the location of a root $C_2(518)$. The processor 36 determines the location of the root $C_2(518)$ by invoking the corner finding subroutine 450, shown in FIG. 6F, as described in the first embodiment. Once the root $C_2(518)$ has been located, the processor 36 returns to the main routine 650 and proceeds to step 656.

In step 656, the processor 36 follows a direction, along the upper vertical reference bar 528 from $C_2(518)$ to an inner corner point $r_2(520)$ by again invoking the corner finding subroutine 450, shown in FIG. 6F. Once the processor 36 using subroutine 450 has determined the location of the inner corner point $r_2(520)$, it then proceeds to step 658. In step 658, the processor 36 determines the position of a top point $R_2(522)$ by invoking the bar crossing subroutine 500, as shown in FIG. 6G, which operates as described in the first embodiment. Once the processor 36 has determined the position of the point $R_2(522)$ it returns to the main routine 650, shown in FIG. 8A, and proceeds to step 660.

In step 660, the processor 36 determines the location of a root $C_3(524)$ by invoking the corner finding subroutine 450, shown in FIG. 6F, that moves along the bottom bar 516 from the previously detected end point $ep_3(512)$ until it detects the location of a root $C_3(524)$. The subroutine 450 carries out the same operations as described in the first embodiment. Once the root $C_3(524)$ has been located, the processor 36 returns to the main routine 650 and proceeds to step 662.

In step 662, the processor 36 follows a direction along the lower vertical reference bar 28 from the root $C_3(524)$ to an inner corner $r_3(526)$ by again invoking the corner finding subroutine 450, shown in FIG. 6F. Once the processor 36, using subroutine 450, has determined the location of the inner corner point $r_3(526)$, it then returns to the main routine 650, shown in FIG. 8A, and proceeds to step 664. In step 664, the processor 36 determines the position of a bottom point $R_3(530)$ by invoking the bar crossing subroutine 500, as shown in FIG. 6G. Once the processor 36 has successfully determined the bottom point $R_3(530)$ it returns to the main routine 650, shown in FIG. 8A, and stores the values of the top point $R_2(522)$, the end points $ep_1$, $ep_2$, $ep_3$ and $ep_4$, and the bottom point $R_3(530)$ in its memory. The processor 36 then proceeds to invoke a subroutine 666, shown in FIG. 8B, which computes the positions of corner points for the top bounding box 502 and the lower bounding box 504.

Figure 7B:
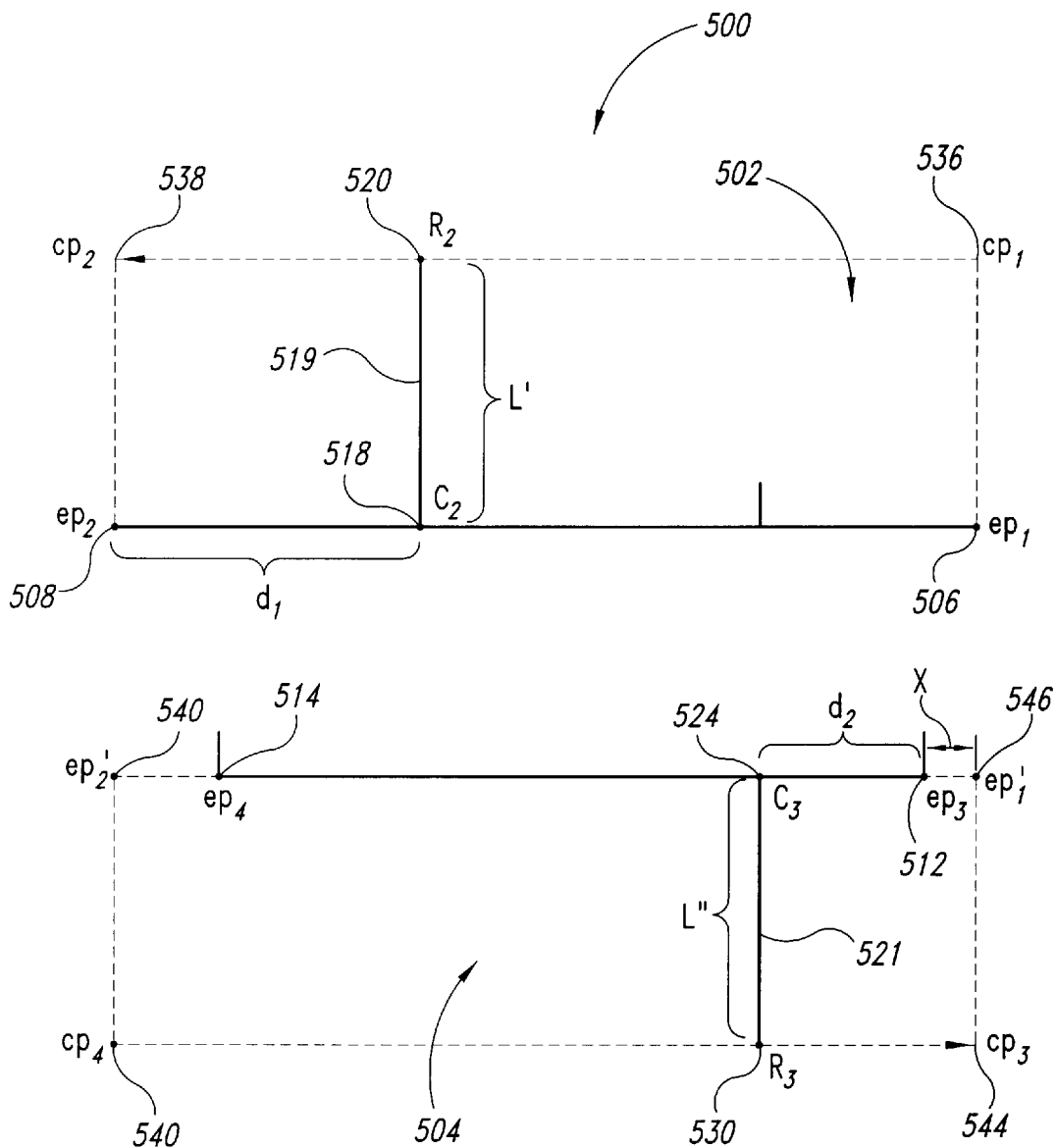
FIG. 7B shows, in a second embodiment, an example of a method for determining the corner points of a top and bottom bounding box of the version A and version B Code One symbols.

Referring to FIG. 8B, in step 668 of the subroutine 666, the processor 36 recalls and inputs the previously determined positions or values of the end points $ep_1(506)$ and $ep_2(508)$, $ep_3(512)$, and $ep_4(514)$ as well as the roots $C_2(518)$ and $C_3(524)$, the top point $R_2(522)$, and the bottom point $R_3(530)$. The processor 36 also inputs the length of X dimensions measured longitudinally outward from the lower bar end points $ep_3(512)$ and $ep_4(514)$ to the edge of data cells $ep'_1(546)$ and $ep'_2(540)$, respectively, of the symbol 500 (FIG. 7B). Next, in step 670, the processor 36 proceeds to step 670 of the subroutine 666 and calculates various lengths and distances of lines connecting the various inputted values. First the processor 36 determines a length $L'(519)$ of a line connecting the root $C_2(518)$ and the top point $R_2(522)$, as shown in FIG. 7B. Then, the processor 36 determines a length $L''(521)$ of a line connecting the root $C_3(524)$ and the bottom point $R_3(526)$. The processor 36 also measures a distance $d_1$, shown in FIG. 7B, between the end point $ep_2(508)$ and the root $C_2(518)$. Finally, in step 670, the processor 36 determines a distance $d_2$, shown in FIG. 7B, between the root $C_3(524)$ and the end point $ep_3(512)$. After determining values for $L'$, $L''$, $d_1$ and $d_2$, the processor 36 stores these values in its memory, and proceeds to calculate the corner points of the upper bounding box 502, and the lower bounding box 504 of the symbol 500.

Initially, the processor 36 calculates the position of a first corner point $cp_1(536)$ in step 672 of subroutine 666. To determine the position of the point $cp_1(536)$ along the X-axis of the Cartesian coordinate system used to retrieve data from an image, the processor 36 calculates $Xcp_1$ using the following equation:

$$Xcp_1 = Xep_1 + L'\cos(\angle \overline{R_3C_3}).$$

Then, to determine the position of $cp_1$(536) along the Y-axis of the Cartesian coordinate system, the processor 36 calculates $Ycp_1$ with the equation:

$$Ycp_1 = Yep_1 + L'\sin(\angle \overline{R_3C_3}).$$

Once the processor 36 has calculated and stored the position of the first corner point $cp_1$(536), it then proceeds to step 674.

In step 674 of subroutine 666, the processor 36 calculates the position of a second corner point $cp_2$(538). To determine the position of $cp_2$(538) along the X-axis of the Cartesian coordinate system, the processor 36 calculates $Xcp_2$ with the equation:

$$Xcp_2 = X_{R2} + d_1\cos(\angle \overrightarrow{ep_1ep_2}).$$

Then, to determine the position of the point $cp_2$(538) along the Y-axis of the Cartesian coordinate system, the processor 36 calculates $Ycp_2$ with the equation:

$$Ycp_2 = Y_{R2} + d_1\sin(\angle \overrightarrow{ep_1ep_2}).$$

Once the processor 36 has calculated and stored the position of the second corner point $cp_2$(538), the processor 36 proceeds to step 676, and determines the position of an end point $ep'_2$(540), which defines a corner of the lower bounding box 504.

To determine the position of the point $ep'_2$(540) along the X-axis of the Cartesian coordinate system, the processor 36 calculates $Xep'_2$ with the equation:

$$Xep'_2 = Xep_2 + X_{dim}\cdot\cos(\angle \overrightarrow{ep_3ep_4}),$$

where $X_{dim}$ is the X-dimension determined above for the symbol 500. Then, to determine the position of the point $ep_2$ along the Y-axis of the Cartesian coordinate system, the processor 36 calculates $Yep'_2$ with the equation:

$$Yep'_2 = Yep_2 + X_{dim}\cdot\sin(\angle \overrightarrow{ep_3ep_4}).$$

Next, in step 678, the processor 36 determines the position of an end point $ep'_1$(546), which defines a corner of the lower bounding box 504. To determine the position of the point $ep'_1$(546) along the X-axis of the Cartesian coordinate system, the processor 36 calculates $Xep'_1$ with the equation:

$$Xep'_1 = Xep_3 + X_{dim}\cdot\cos(\angle \overrightarrow{ep_4ep_3}).$$

Then, to determine the position of $ep'_1$(546) along the Y-axis of the Cartesian coordinate system, the processor 36 calculates $Yep'_1$ with the equation:

$$Yep'_1 = Yep_3 + X_{dim}\cdot\sin(\angle \overrightarrow{ep_4ep_3}).$$

Following the determination and storage of the position of the end points, the processor 36 proceeds to step 680 to calculate the position of a fourth corner point $cp_4$(540).

The processor 36 determines the position of the fourth corner point $cp_4$(540) along the X-axis of the Cartesian coordinate system, i.e., $Xcp_4$, with the equation:

$$Xcp_4 = Xep'_2 + L''\cos(\angle \overline{R_2C_2}).$$

Then, the processor 36 determines the position of the point $cp_4$(540) along the Y-axis of the Cartesian coordinate system, i.e., $Ycp_4$, with the equation:

$$Ycp_4 = Yep'_2 + L''\sin(\angle \overline{R_2C_2}).$$

Finally, the processor 36 proceeds to step 682 where it calculates the position of a third corner point $cp_3$(544).

The processor 36 determines the position of the third corner point $cp_3$(544) along the X-axis of the Cartesian coordinate system with the following equation:

$$Ycp_3 = X_{R3} + (d_2 + X_{dim})\cdot\cos(\angle \overrightarrow{ep_4ep_3}).$$

Then, the processor 36 determines the position of the point $cp_3$(544) along the Y-axis of the Cartesian coordinate system using the equation:

$$Ycp_3 = X_{R3} + (d_2 + X_{dim})\cdot\sin(\angle \overrightarrow{ep_4ep_3}).$$

After the final corner point $cp_3$(544) has been found, the processor 36 returns to the main routine 650, shown in FIG. 8A, stores positions or values of the points $cp_1$(536), $cp_2$(538), $ep_2$(508), and $ep_1$(506) which define the upper bounding box 502, as well as values of the points $ep'_2$(540), $ep'_1$(546), $cp_4$(540), and $cp_3$(544), which define the lower bounding box 504. All recoverable information in data cells of the symbol 500 lie within these two bounding boxes, and the processor 36 realigns the Cartesian coordinate system to compensate for any distortion in the image during information retrieval using the boundaries defining the bounding boxes. Once all the information has been retrieved, stored and decoded by the processor 36, it sets a flag indicating that the corrective procedure has been performed and information retrieval by the reader 20 may proceed.

Thus, the present invention allows the accurate determination of bounding boxes by minimizing any inherent error in the calculation of its boundaries. This error minimization is accomplished by utilizing the vertical reference bars when calculating the corner points of the bounding boxes.

Except as otherwise disclosed herein, the various components shown in outline or block form in FIG. 4 are individually well known and the internal construction of their operation is not critical either to the making or the using of this invention or to a description of the best mode of the invention.

While the detailed description above has been expressed in terms of specific examples, those skilled in the art will appreciate that many other configurations could be used to accomplish the purpose of the disclosed inventive apparatus. Accordingly, it would be appreciated that the various equivalent modifications of the above-described embodiments may be made without departing from the spirit and scope of the invention. Therefore, the invention is to be limited only by the following claims.

I claim:

1. A method for computing a location of data regions in a stored image of a symbol, the symbol including a recognition pattern having an outermost bar and at least one vertical reference pattern extending perpendicularly from the recognition pattern, said method comprising the steps of:

locating a position of a first end point and a second end point of the outermost bar of the recognition pattern;

locating a position of an outermost point of each of the at least one vertical reference pattern;

determining a position of a first corner point and a second corner point for the symbol by extending at least one line from the outermost point a predetermined distance in a predetermined direction, wherein the first and second corner points differ from the first and second end points; and defining a periphery of the symbol using the positions of the first end point, the second end point, the first corner point, and the second corner point.

2. The method for computing a location according to claim 1 wherein said step of locating the position of the outermost point includes the steps of:

moving along the outermost bar from at least one of the first end point toward the second end point until a root point at an adjacent base of the vertical reference pattern is reached;

traveling along each of the at least one vertical reference pattern until an inner corner of a foot of the at least one vertical reference pattern is reached; and crossing the foot of the at least one vertical reference pattern to determine the location of the outermost point.

3. The method for computing a location according to claim 2 wherein said step of moving along the outermost bar includes the steps of:

starting at one of the first end point and the second end point to advance a predesignated distance along an edge of the outermost bar;

proceeding to incrementally advance along the edge of the outermost bar from the predesignated distance until at least one of an edge is no longer detected ahead of the advance and a direction of the edge changes by more than approximately 90°; and designating a termination of the advance along the outermost bar as the root point of the at least one vertical reference pattern.

4. The method for computing a location according to claim 3 wherein the predesignated distance is dependent on an X-dimension and a version of the symbol.

5. The method for computing a location according to claim 3 wherein said step of traveling along each of the at least one vertical reference pattern includes the steps of:

starting at one of the root point of the at least one vertical reference pattern and advancing a second predesignated distance along an edge of the at least one vertical reference pattern;

proceeding to incrementally advance along the at least one vertical reference pattern until at least one of an edge is no longer detected ahead of the advance and a direction of the edge alters by more than approximately 90°; and designating a termination of the advance along the at least one vertical reference pattern as the inner corner of the foot of the at least one vertical reference pattern.

6. The method for computing a location according to claim 5 wherein said step of crossing the foot of the at least one vertical reference pattern includes the steps of:

taking a reading of an intensity at a present position;

comparing the intensity against a threshold intensity;

incrementally advancing the position along a crossing direction until an intensity at a current point exceeds the threshold intensity; and designating the current point where the threshold intensity was exceeded as the outermost point.

7. The method for computing a location according to claim 5 wherein the crossing direction is perpendicular to an entry boundary on the foot.

8. The method for computing a location according to claim 1, further comprising the step of estimating an upper bounding box and a lower bounding box, wherein at least a portion of the upper and lower bounding boxes extend along the periphery of the symbol.

9. The method for computing a location according to claim 8 wherein the first and second end points correspond to the upper bounding box and wherein positions of first and second end points of the bottom bounding box are determined by extrapolating the positions of the first end point and the second end point of the top bounding box a predetermined distance, respectively.

10. The method for computing a location according to claim 9 wherein the predetermined distance is based on an X-dimension of the symbology.

11. The method for computing a location according to claim 1 wherein said step of determining a position of first and second corner points includes the steps of:

determining positions of first and second root points respectively located at intersections between first and second vertical reference patterns and the outermost bar of the recognition pattern; and calculating the predetermined distance based on a ratio defined by a distance between the first and second outermost points of the first and second vertical reference patterns multiplied by a distance between one of the first and second root points and one of the first and second end points of the outermost bar divided by a distance between the first and second root points.

12. The method for computing a location according to claim 11, further comprising the step of:

comparing an angle of a line connecting the first end point and the second end point with a line connecting first and second outermost points of first and second vertical reference bars, respectively, to determine a correction value; and wherein the step of calculating the predetermined distance includes multiplying the ratio by the correction value.

13. A method for computing an upper and lower bounding box of a Code One symbol having a recognition pattern, including a top bar adjacent the upper bounding box and a lower bar adjacent the lower bounding box, and four vertical reference bars, each having a foot portion end away from the recognition pattern and a root portion, the four vertical reference bars including first and second vertical reference bars where the root portion is contiguous with the top bar, and third and fourth vertical reference bars where the root portion is contiguous with the lower bar, said method comprising the steps of:

locating a position of a first end point and a second end point of the top bar;

determining the location of the root portion of the first and second vertical reference bars from the first and second end points, respectively;

locating an inner corner of the foot of the first and second vertical reference bars from the root portion of the first and second vertical reference bars, respectively;

crossing the foot of the first and second vertical reference bars to reach a top point of the first and second vertical reference bars;

extrapolating from the top point of the first and second vertical reference bars in a first predetermined direction for a first predetermined distance to reach first and second corner points;

projecting from the first and second end points in a second predetermined direction along the recognition pattern to third and fourth end points in line with the lower bar;

determining the location of the root portion of the third and fourth vertical reference bars from the third and fourth end points, respectively;

locating an inner corner of the foot of the third and fourth vertical reference bars from the root portion of the third and fourth vertical reference bars, respectively;

crossing the foot of the third and fourth vertical reference bars to reach a bottom point of the third and fourth vertical reference bars;

extrapolating from the bottom point of the third and fourth vertical reference bars in a third predetermined direction for a third predetermined distance to reach third and fourth corner points;

defining the upper bounding box using the first and second end points as well as the first and second corner points; and defining the lower bounding box using the third and fourth end points as well as the third and fourth corner points.

14. The method for computing according to claim 13 wherein the step of determining the location of the root portion of the first and second vertical reference bars includes the steps of:

moving along the top bar in incremental steps from the first and second end points, respectively;

continuing to advance along the top bar until at least one of an edge is no longer detected ahead of the advance and a direction of the edge changes by approximately 90°; and designating a termination of the advance along the top bar as the root portion of the first and second vertical reference bars.

15. The method for computing according to claim 13 wherein the step of locating an inner corner of the foot of the first and second vertical reference bars, comprises the steps of:

starting at the root portion of the first and second vertical reference patterns;

proceeding to incrementally advance along the at least one vertical reference pattern until at least one of an edge is no longer detected ahead of the advance and a direction of the edge alters by approximately more than 90°; and designating a termination of the advance along the first and second vertical reference patterns as the inner corner of the foot of the first and second vertical reference patterns.

16. The method for computing according to claim 13 wherein the step of crossing the foot of the first and second vertical reference patterns comprises the steps of: taking a reading of an intensity at a preset position;

comparing the intensity against a threshold intensity;

incrementally advancing the position along a crossing direction until the intensity at that point exceeds the threshold intensity; and designating the position where the threshold intensity was exceeded as the top point of the first and second vertical reference bars.

17. An apparatus for decoding a machine-readable symbol representing encoded information, the symbol having a recognition pattern with an outermost bar and at least one vertical reference pattern extending approximately perpendicular from the recognition pattern, the apparatus comprising:

a sensor that receives light reflected from the symbol and produces an output signal therefrom;

a receiver that receives the output signal and produces a data signal indicative of the encoded information, the recognition pattern and the at least one vertical reference pattern; and a processor for decoding the encoded information encoded in the symbol, the processor being programmed to (a) locate a position of a first end point and a second end point of the outermost bar of the recognition pattern, (b) locate a position of an outermost point of each of the at least one vertical reference pattern, (c) determine a position of a first corner point and a second corner point for the symbol by extending at least one line from the outermost point a predetermined distance in a predetermined direction, wherein the first and second corner points differ from the first and second end points, (d) define a periphery of the symbol using the positions of the first end point, the second end point, the first corner point and the second corner point, and (e) decode the encoded information within the periphery of the symbol.

18. The apparatus of claim 17 wherein the processor is programmed to locate the position of the outermost point by (i) moving along the outermost bar from at least one of the first end point toward the second end point until a root point at an adjacent base of the vertical reference pattern is located, (ii) traveling along each of the at least one vertical reference pattern until an inner corner of a foot of the at least one vertical reference pattern is located, and (iii) crossing the foot of the at least one vertical reference pattern to determine the location of the outermost point.

19. The apparatus of claim 18 wherein the processor moves along the outermost bar by (i) starting at one of the first end point and the second end point to advance a predesignated distance along an edge of the outermost bar, (ii) proceeding to incrementally advance along the edge of the outermost bar from the predesignated distance until at least one of an edge is no longer detected ahead of the advance and a direction of the edge changes by approximately more than 90°, and (iii) designating a termination of the advance along the outermost bar as the root point of the at least one vertical reference pattern.

20. The apparatus of claim 18 wherein the processor travels along the vertical reference pattern by (i) starting at one of the root point of the at least one vertical reference pattern and advancing a second predesignated distance along an edge of the at least one vertical reference pattern, (ii) proceeding to incrementally advance along the at least one vertical reference pattern until at least one of an edge is no longer detected ahead of the advance and a direction of the edge alters by approximately more than 90°, and (iii) designating a termination of the advance along the at least one vertical reference pattern as the inner corner of the foot of the at least one vertical reference pattern.

21. The apparatus of claim 20 wherein the processor crosses the foot by (i) taking a reading of a light intensity at a present position, (ii) comparing the light intensity against a threshold light intensity, (iii) incrementally advancing the position along a crossing direction until an intensity at a current point exceeds the threshold light intensity, and (iv) designating the current point where the threshold intensity was exceeded as the outermost point.

22. The apparatus of claim 17 wherein the processor is programmed to determine the position of the first and second corner points by (i) comparing an angle of a line connecting the first end point and the second end point with a line connecting the outermost point of each of the at least one vertical reference pattern to determine the predetermined direction, and (ii) calculate the predetermined distance based on the distance between the first and second end point and the at least one vertical reference pattern, as well as the distance between the outermost point of each of the at least one vertical reference pattern.

23. A method for computing a location of data regions in a stored image of a symbol, wherein the symbol includes a recognition pattern having an outermost bar and at least one vertical reference pattern extending approximately perpendicularly from the recognition pattern, the method comprising the steps of:

identifying a position of first and second end points of the outermost bar of the recognition pattern;

locating a position of an outermost point of the at least one vertical reference pattern, wherein the data regions in the stored image of the symbol extend on opposite sides of the at least one vertical reference pattern;

identifying a position of first and second corner points for the stored image of the symbol, wherein the first and second corner points differ from the first and second end points; and identifying a periphery of the data regions in the stored image of the symbol based on the positions of the first and second end points and first and second corner points.

24. A method for computing a location of data regions in a stored image of an image of a symbol, wherein the symbol includes a recognition pattern having an outermost bar and at least one vertical reference pattern extending approximately perpendicularly from the recognition pattern, the method comprising the steps of:

identifying a position of first and second end points of the outermost bar of the recognition pattern;

locating a position of an outermost point of the at least one vertical reference pattern, wherein an image of the recognition pattern in the stored image fails to accurately define data regions in the stored image of the symbol;

identifying a position of first and second corner points for the stored image of the symbol, wherein the first and second corner points differ from the first and second end points; and accurately defining a periphery of the data regions in the stored image of the symbol based on the positions of the first and second end points and first and second corner points.

* * * * *